US012518235B1

(12) United States Patent
Elliott et al.

(10) Patent No.: US 12,518,235 B1
(45) Date of Patent: Jan. 6, 2026

(54) SYSTEM AND METHOD FOR COLLECTING, CONVERTING AND STANDARDIZING WASTE AND/OR RECYCLING DATA AND DEVELOPING SUSTAINABILITY DECISION MODELS AND REPORTING

(71) Applicant: WM Intellectual Property Holdings, L.L.C., Houston, TX (US)

(72) Inventors: Ken Elliott, Houston, TX (US); Eric Anthony Dixon, Bloomfield Hills, MI (US); Julia Tsvetkova, Houston, TX (US); Scott Jameson, Houston, TX (US); Kim Stephen Harrington, Milton, GA (US); Martin R. Felker, Appleton, WI (US); Venu Kumar Gajjala, Windsor, CT (US); Mary Parlante, Windsor, CT (US); Andrew Barlett, Windsor, CT (US)

(73) Assignee: WM Intellectual Property Holdings, L.L.C., Houston, TX (US)

( * ) Notice: Subject to any disclaimer, the term of this patent is extended or adjusted under 35 U.S.C. 154(b) by 0 days.

(21) Appl. No.: 18/605,018

(22) Filed: Mar. 14, 2024

Related U.S. Application Data

(60) Provisional application No. 63/452,951, filed on Mar. 17, 2023.

(51) Int. Cl.
*G06Q 10/0639* (2023.01)
*G06Q 10/067* (2023.01)
*G06Q 10/30* (2023.01)
*G06Q 30/018* (2023.01)

(52) U.S. Cl.
CPC ..... *G06Q 10/06393* (2013.01); *G06Q 10/067* (2013.01); *G06Q 10/30* (2013.01); *G06Q 30/018* (2013.01)

(58) Field of Classification Search
CPC .............. G06Q 10/067; G06Q 30/018; G06Q 10/06393; G06Q 10/30
See application file for complete search history.

(56) References Cited

U.S. PATENT DOCUMENTS

| 7,983,929 B2 | 7/2011 | Zimmerman |
| 8,165,890 B2 | 4/2012 | Roberts |
| 8,165,891 B2 | 4/2012 | Roberts |

(Continued)

FOREIGN PATENT DOCUMENTS

| EP | 4272136 | 11/2023 |
| WO | 2022/146427 | 7/2022 |

OTHER PUBLICATIONS

Ecohedge; Carbon Accounting Software: Streamline Your Sustainability Efforts; EcoHedge Ltd .; Jan. 8, 2024; 20 pages.

(Continued)

*Primary Examiner* — Charles Guiliano
(74) *Attorney, Agent, or Firm* — Greenberg Traurig LLP

(57) ABSTRACT

A system and method for collecting and standardizing data related to the management of waste and recyclable materials are provided. The system and method can be utilized to aggregate, analyze, display and distribute relevant sustainability decision support models, data and metrics. The system and method can also include collecting, converting and standardizing of waste and/or recycling data and developing sustainability decision models and reporting.

7 Claims, 32 Drawing Sheets

(56) References Cited

U.S. PATENT DOCUMENTS

| | | |
|---|---|---|
| 8,275,630 B2 | 9/2012 | Dunning |
| 8,311,975 B1 | 11/2012 | Gonsalves |
| 8,812,971 B2 | 8/2014 | Benedek et al. |
| 10,311,394 B2 | 6/2019 | Miller et al. |
| 10,438,281 B2 | 10/2019 | Walsh et al. |
| 10,535,022 B1 | 1/2020 | Hood et al. |
| 10,853,353 B2 | 12/2020 | Balaraman et al. |
| 10,984,394 B2 | 4/2021 | Collins et al. |
| 11,327,957 B2 | 5/2022 | Su et al. |
| 11,481,257 B2 | 10/2022 | Sharma et al. |
| 11,508,021 B2 | 11/2022 | Hovhannisyan et al. |
| 11,693,705 B2 | 7/2023 | Sharma et al. |
| 11,734,074 B2 | 8/2023 | Sharma et al. |
| 11,875,296 B2 | 1/2024 | Benjamin et al. |
| 2005/0015287 A1 | 1/2005 | Beaver |
| 2005/0209905 A2 * | 9/2005 | Ness .................. G06Q 30/02 |
| | | 705/7.38 |
| 2009/0281677 A1 | 11/2009 | Botich et al. |
| 2010/0145629 A1 | 6/2010 | Botich et al. |
| 2010/0228601 A1 | 9/2010 | Vaswani et al. |
| 2010/0235209 A1 | 9/2010 | Vaswani et al. |
| 2011/0071867 A1 | 3/2011 | Chen et al. |
| 2012/0004938 A1 | 1/2012 | Beaver |
| 2013/0132233 A1 | 5/2013 | Rothley et al. |
| 2013/0290511 A1 | 10/2013 | Tu et al. |
| 2014/0012553 A1 | 1/2014 | Kelly et al. |
| 2014/0214220 A1 | 7/2014 | Kamel et al. |
| 2014/0222665 A1 | 8/2014 | Kamel et al. |
| 2014/0236680 A1 | 8/2014 | Chen et al. |
| 2014/0303935 A1 | 10/2014 | Kamel et al. |
| 2014/0337107 A1 * | 11/2014 | Foster ............. G06Q 10/06395 |
| | | 705/7.41 |
| 2015/0199846 A1 | 7/2015 | Sanderson et al. |
| 2016/0203146 A1 | 7/2016 | Moll et al. |
| 2018/0268379 A1 * | 9/2018 | Collins ............. G06Q 10/0838 |
| 2021/0217156 A1 * | 7/2021 | Balachandran ........ G06V 20/00 |
| 2022/0027810 A1 | 1/2022 | Murthy et al. |
| 2022/0108252 A1 | 4/2022 | Narasimhan et al. |
| 2022/0230251 A1 | 7/2022 | Kawamori et al. |
| 2022/0327538 A1 | 10/2022 | Kumar et al. |
| 2022/0343433 A1 * | 10/2022 | Yan ...................... G06Q 40/06 |
| 2023/0061787 A1 | 3/2023 | Feickert et al. |
| 2023/0394495 A1 | 12/2023 | Abdelsamic |
| 2024/0037471 A1 | 2/2024 | Jones et al. |

OTHER PUBLICATIONS

Kareem, Shefy Manayil; Introducing new ESG data and reporting capabilities in Microsoft Cloud for Sustainability; Jun. 15, 2023; 11 pages.

Lawton, George; 18 Sustainability Management Software Providers to Consider; Apr. 11, 2023; 10 pages.

Young, Ben et al.; A System for Standardizing and Combining U.S. Environmental Protection Agency Emissions and Waste Inventory Data; Applied Sciences; Mar. 28, 2022; 16 pages.

* cited by examiner

FIG. 10

DISPLAY & REPORTING
- SUBSCRIBE TO DASHBOARDS, REPORTS, ALERTS
- PUBLISH DASHBOARDS, REPORTS, ALERTS

ANALYTICS
- ML (SUPERVISED, UN-SUPER., REENFORCED) MODEL LIBRARY

SUBSCRIPTIONS
- SUBSCRIBE MICRO SERVICES
- DAAS: DATA ON-DEMAND
- RAAS
- AAAS
- TRANSFORM INVOICE DATA TO SERVICE ORIENTED EVENTS, E.G., DISCARDED MATERIAL PICKUP
- PACKAGE & BUNDLE SERVICES
- CRAWLER
- REGISTER

SUSTAINABILITY ANALYTICS SERVICE CENTER 001

DATA MANAGEMENT
- EDITOR
- DATA CLUSTERING
- DATA CLASSIFICATION
- DATA NORMALIZER
- DATA INTEGRITY & VALIDATION
- DATA LIBRARY
- CREATE DATA ONTOLOGICAL STRUCTURES
- SOURCE PLUG-INS/ CONNECTORS/ JOINING; EAP, ESG, APIs ARE EXPOSED TO REGISTERED ENTITIES
- SOURCE NORMALIZER
- DATA PERSISTENCE, MAINTENANCE, SECURITY

DATA HOMOGENIZATION
- TRANSFORM HETEROGENEOUS TO HOMOGENIZED STRUCTURES

CRAWLER
- PROACTIVELY SECURE RELEVANT INFORMATION
- PROACTIVELY IDENTIFY POTENTIAL PRODUCERS AND CONSUMERS
- FIND AND REGISTER
- OFFER FREE LIMITED-SERVICE CAPABILITY IMMEDIATELY
- CONDUCT SECURITY ASSESSMENTS

SERVICE DEPLOYMENT
- PUBLISH SERVICE
- PACKAGE SERVICES
- DEPRECATE SERVICES

SERVICE CONSTRUCTORS
- PUBLISH/ REMOVE/ SUSPEND
- SERVICE MANAGER
- SERVICE CONSTRUCTOR/ DESTRUCTOR
- MICRO SERVICE CONSTRUCTOR/ DESTRUCTOR
- SERVICE TESTING AND VALIDATION

TRANSPORTATION EVENT ANALYTICS
- MEANS OF CONVEYANCE
- EVENT ASSESSMENT
- MEANS OF MATERIAL
- PROCESSING PER EVENT
- MATERIAL TYPES
- ENERGY CONSUMED

GRAPHIC CONSTRUCTOR
- DATA PRESENTATION MANAGEMENT
- CREATE AND DEFINE GRAPHIC TYPES, 2D AND 3D 4D (W.R.T. TIME FORECASTING MECHANISM)
- CREATE REPORTS

SERVICE CALCULATOR
- METRICS & FORMULA MANAGEMENT
- SET TARGETS; RUN 'WHAT-IF' SCENARIOS' & ENERGY CONSUMED
- SCOPE 3

CONSUMER/PRODUCER ACCESS PROFILES

CONTINUOUS & REAL-TIME AUTHENTICATION/ SECURITY

| Enterprise | Line of Business | Functional | Service Level |
|---|---|---|---|
| ABC Foods | Retail | Blue Region | Warehouse 1<br>Store 1<br>Store 2 |
| | | Orange Region | Warehouse 2<br>Store 3<br>Store 4 |
| | Product Development | Frozen | Ice Cream |
| | | Sodas | Root Beer |
| | Offices | Corporate | Corp Office |
| | | Non-Corporate | Branch 1<br>Branch 2 |

FIG. 13

| Organizational Hierarchy | | | | | | | Location Hierarchy | | | | |
|---|---|---|---|---|---|---|---|---|---|---|---|
| Level 1: Organization | Level 2: Line of Business | Level 3: Function of Business | Level 4: Sub-Function | Level 5: Service-Location | Level 6: Sub-Facility | Level 7: Container | Level 1: Country | Level 2: Region | Level 3: State/Province | Level 4: Metropolitan Statistical Area (MSA)/city | Level 5: Zip Code |
| ABC Foods | Retail | Blue Region | N/A | Warehouse 1 | N/A | N/A | USA | N/A | WA | Small Town | 98989 |
| ABC Foods | Retail | Blue Region | N/A | Store 1 | N/A | N/A | USA | N/A | WA | Small Town | 98989 |
| ABC Foods | Retail | Blue Region | N/A | Store 2 | N/A | N/A | USA | N/A | WA | Small Town | 98989 |
| ABC Foods | Retail | Orange Region | N/A | Warehouse 2 | N/A | N/A | USA | N/A | ID | Lake City | 89898 |
| ABC Foods | Retail | Orange Region | N/A | Store 3 | N/A | N/A | USA | N/A | ID | Lake City | 89898 |
| ABC Foods | Retail | Orange Region | N/A | Store 4 | N/A | N/A | USA | N/A | ID | Lake City | 89898 |
| ABC Foods | Product Development | Frozen | N/A | Ice Cream Plant | N/A | N/A | USA | N/A | WA | Any Town | 98988 |
| ABC Foods | Product Development | Sodas | N/A | Root Beer Plant | N/A | N/A | USA | N/A | ID | Meadow | 89898 |
| ABC Foods | Offices | Corporate | N/A | Corp Office | N/A | N/A | USA | N/A | WA | Any Town | 98988 |
| ABC Foods | Offices | Non Corporate | N/A | Branch 1 | N/A | N/A | USA | N/A | ID | Lake City | 89898 |

FIG. 14

| Organization Unit | Intensity Name | Start Year | End Year | Intensity Metric Value |
|---|---|---|---|---|
| Store 1 | Transactions Count | 2020 | 2020 | 18,000 |
| Store 1 | Transactions Count | 2021 | 2021 | 18,500 |
| Store 1 | Transactions Count | 2022 | 2022 | 20000 |
| Store 2 | Transactions Count | 2020 | 2020 | 16,000 |
| Store 2 | Transactions Count | 2021 | 2021 | 18,000 |
| Store 2 | Transactions Count | 2022 | 2022 | 21000 |
| Store 3 | Transactions Count | 2020 | 2020 | 21,000 |
| Store 3 | Transactions Count | 2021 | 2021 | 21,500 |
| Store 3 | Transactions Count | 2022 | 2022 | 23000 |
| Store 4 | Transactions Count | 2020 | 2020 | 14,000 |
| Store 4 | Transactions Count | 2021 | 2021 | 16,000 |
| Store 4 | Transactions Count | 2022 | 2022 | 18000 |

| Service Date | Service Location | Material | Volume | Service Provider |
|---|---|---|---|---|
| January 3 | Store 1 | Solid Waste | 10 Cubic Yard | Delta Waste |
| January 3 | Store 1 | Single Stream Rcyl | 10 Cubic Yard | Delta Waste |
| January 4 | Store 1 | Food Waste | 6 Cubic Yard | Sigma Composting |
| January 6 | Store 1 | Solid Waste | 10 Cubic Yard | Delta Waste |
| January 6 | Store 1 | Single Stream Rcyl | 10 Cubic Yard | Delta Waste |
| January 10 | Store 1 | Solid Waste | 10 Cubic Yard | Delta Waste |
| January 10 | Store 1 | Single Stream Rcyl | 6 Cubic Yard | Delta Waste |
| January 11 | Store 1 | Food Waste | 6 Cubic Yard | Sigma Composting |
| January 13 | Store 1 | Solid Waste | 10 Cubic Yard | Delta Waste |
| January 13 | Store 1 | Single Stream Rcyl | 10X1 Cubic Yard Bales | Delta Waste |
| January 16 | Store 1 | Cardboard | 10 Cubic Yard | Omega Paper |
| January 17 | Store 1 | Solid Waste | 10 Cubic Yard | Delta Waste |
| January 17 | Store 1 | Single Stream Rcyl | 6 Cubic Yard | Delta Waste |
| January 18 | Store 1 | Food Waste | 10 Cubic Yard | Sigma Composting |
| January 20 | Store 1 | Solid Waste | 10 Cubic Yard | Delta Waste |
| January 20 | Store 1 | Single Stream Rcyl | 10 Cubic Yard | Delta Waste |
| January 24 | Store 1 | Solid Waste | 10 Cubic Yard | Delta Waste |
| January 24 | Store 1 | Single Stream Rcyl | 10 Cubic Yard | Delta Waste |
| January 25 | Store 1 | Food Waste | 6 Cubic Yard | Sigma Composting |
| January 27 | Store 1 | Solid Waste | 10 Cubic Yard | Delta Waste |
| January 27 | Store 1 | Single Stream Rcyl | 10 Cubic Yard | Delta Waste |
| January 31 | Store 1 | Solid Waste | 10 Cubic Yard | Delta Waste |
| January 31 | Store 1 | Single Stream Rcyl | 10 Cubic Yard | Delta Waste |

| Time | Event | Customer | Truck/Route | Container Size | Material | Address 1 | Destination | Disposal Code |
|---|---|---|---|---|---|---|---|---|
| 8 am | Leave Yard | | | | | | | |
| 8:30 | Pickup | Cust 1 | 501/22 | 10 Cubic Yard | Solid Waste | 123 Main | | |
| 8:45 | Pickup | Cust 2 | 501/22 | 10 Cubic Yard | Solid Waste | 124 Main | | |
| 8:55 | Pickup | ABC Foods Store 1 | 501/22 | 10 Cubic Yard | Solid Waste | 201 Main | | |
| 9:05 | Pickup | Cust 4 | 501/22 | 12 Cubic Yard | Solid Waste | 300 Main | | |
| 9:10 | Break | | 501/22 | | | | | |
| 9:30 | Pickup | Cust 5 | 501/22 | 8 Cubic Yard | Solid Waste | 301 B St. | | |
| 9:48 | Pickup | Cust 6 | 501/22 | 12 Cubic Yard | Solid Waste | 425 G St. | | |
| 10:01 | Pickup | Cust 7 | 501/22 | 12 Cubic Yard | Solid Waste | 600 H St. | | |
| 10:40 | Unload | | 501/22 | | Solid Waste | 901 Hwy 1 | Site 1312 | Landfill |

FIG. 18

| Time | Event | Customer | Material | Address | Destination | Tonnage |
|---|---|---|---|---|---|---|
| 11:15 | Pickup | ABC Foods Store 1 | Cardboard | 201 Main | | |
| 12:20 | Dropoff | | | | XYZ Rail Freight | 35 |

FIG. 19

```
{
    "Source": "Delta Waste"
    "Service Rendered":[
        {
            "Date":"3-Jan-2023",
            "Time":"08:55 AM",
            "Customer":"ABC Foods",
            "Service Transaction Type":"Commercial Pickup",
            "Number of Services":"1",
            "Container Size":"10",
            "Container Unit of Measure":"Cubic Yard"
            "Material Type":"Mixed MSW"
            "Material Type Treatment Type Standard":"EPA",
            "Treatment Type":"Landfill-Flare",
            "Service Location Name":"Store 1",
            "Service Location ID":"123XYZ",
            "Source Site Address":"201 Main Small Town, WA 98989",
            "Fuel Type":"Diesel",
            "Gallons Used":"5",
            "Route Customer Count":"7",
        }
    }
```

FIG. 20

For Omega Paper this Information was Received.
{
"Source": "Omega Paper"
"Service Rendered":[
{
"Date":"16-Jan-2023",
"Time":"11:15 AM",
"Customer":"ABC Foods",
"Service Transaction Type":"Industrial Cardboard",
"Number of Services":"1",
"Weight":"35",
"Weight Unit of Measure":"Short Ton",
"Material Type":"CARDBOARD (CORRUGATED CONTAINERS)",
"Material Type Treatment Type Standard":"EPA",
"Treatment Type":"Recycling",
" Service Location Name":"Store 1",
" Service Location ID":"12099",
"Source Site Address":"201 Main Small Town, WA 98989",
}
}

FIG. 21

| | |
|---|---|
| Customer Name* | ABC Foods |
| Service Provider Name | Sigma Composting |
| Service Location Name/ID | Store 1 |
| Address Line 1* | 201 Main St |
| Address Line 2 | |
| City* | Small Town |
| State* | WA |
| Postal Code* | 98989 |
| Day | |
| Month* | January |
| Year* | 2023 |
| Frequency | Weekly |
| Material* | Food Waste |
| Additional Waste Descriptions | |
| Tonnage | |
| Unit | |
| Container Type | |
| Other Container Types | |
| Container Size | 6 |
| Other Container Sizes | |
| Unit of Measure | Cubic Yard |
| LF Diversion Status* | YES |
| Treatment Method* | Composting |

FIG. 22

SYSTEM AND METHOD FOR COLLECTING, CONVERTING AND STANDARDIZING WASTE AND/OR RECYCLING DATA AND DEVELOPING SUSTAINABILITY DECISION MODELS AND REPORTING

RELATED APPLICATIONS

This application claims the benefit, and priority benefit, of U.S. Provisional Patent Application Ser. No. 63/452,951, filed Mar. 17, 2023, the disclosure and contents of which are incorporated by reference herein in their entirety.

BACKGROUND

1. Field of the Invention

The presently disclosed subject matter relates to sustainability decision models and reporting, and more particularly, to a system and method for using standardized waste and/or recycling data to analyze, process, and develop decision support models to drive circularity in company's materials management and allow companies to confidently report to standard setters and regulatory authorities their progress related to waste and carbon reduction strategies.

2. Description of the Related Art

In recent years, organizations across various industries and the public services sector have launched sustainability initiatives dedicated to reducing overall waste, increasing diversion of waste away from landfills into recycling and composting options, and decreasing carbon emissions associated with waste. Many organizations have sought to establish specific goals such as, e.g., reducing carbon emissions associated with waste by X % by 2030, or 0% plastics waste by 2025.

To be able to set concrete, reliable and science-based goals, it is desirable for organizations to have tools that facilitate comprehensive decision support models and accurate, granular and exhaustive historic and current waste performance data across multiple service providers and for different types of waste streams.

Improvements in this field of technology are therefore desired.

SUMMARY

Various illustrative embodiments of a system and method for collecting, converting and standardizing waste and/or recycling data and developing sustainability decision models and reporting are provided herein.

In certain illustrative embodiments, a method of aggregating, standardizing, modeling, and reporting sustainability data related to waste and recycling in a sustainability as a service environment is provided. Waste and recycling data of a first party can be stored in a standardized format in at least one network-based non-transitory storage device having a collection of waste and recycling data stored thereon. Remote access can be provided to a second party over a network so the second party can update the collection of waste and recycling data in real time with waste and recycling data of the second party through an application programming or graphical user interface, wherein the second party provides the updated data in a non-standardized format based on the hardware and/or software platform used by the second party. The non-standardized updated information can be converted, by a content server, from the second party into the standardized format.

In certain illustrative embodiments, a method of aggregating, standardizing, modeling, and reporting sustainability data related to waste and recycling in a sustainability as a service environment is provided. Waste and recycling data of a first party can be stored in a standardized format in at least one network-based non-transitory storage device having a collection of waste and recycling data stored thereon. Remote access can be provided to a second party over a network so the second party can update the collection of waste and recycling data in real time with waste and recycling data of the second party through an application programming or graphical user interface, wherein the second party provides the updated data in a non-standardized format based on the hardware and/or software platform used by the second party. The non-standardized updated information can be converting, by a content server, from the second party into the standardized format, wherein the converting of the non-standardized updated information from the second party into the standardized format comprises a plurality of, or alternatively each of: standardizing of addresses to match U.S. Postal Service standards for matching address records; standardizing of services and locations between the service provider and customer to allow reporting across customer data to material disposal data; normalization of date period of service events with frequency of services across those date periods grain for proper aggregating and reporting of metrics; standardization of types of business for comparison; standardization of vehicle fuel types; standardization of collection vehicle types; standardization of container types; standardization of units of measure to international standard (ISO) codes; standardization of material codes/names, treatment type codes/names, treatment facility types and region code/names to map to external protocols including but not limited to U.S. EPA WARM, U.S. EPA AP42, U.S. EPA GHG Emission Hub and European Environmental Agency; standardization of intensity factors for benchmarking based on factors including but not limited to square footage, residents, or units produced; and standardization of dates to a common format. The standardized waste and recycling data from the second party can be stored in the collection of waste and recycling data. Sustainability decision models and waste metrics services can be generated that incorporate the standardized waste and recycling data of the first party and the standardized waste and recycling data of the second party. This information can be made available in a high performing sustainability as a service environment to a plurality of third parties over the computer network in real time. In certain aspects, one or more authorized third parties can have immediate access to the standardized waste and recycling data and the sustainability decision models and metrics derived from that data in various subscription configurations to perform modeling and reporting. The subscription configurations can include, without limitation: optimizing of operational waste and recycling sustainability targets by hierarchy level and for specific NAICS classifications; applying analytics models for waste and recycling weight estimation; analyzing carbon trade off scenarios based on material and treatment method; using a graphical interface to visualize sustainability metrics related to waste and recycling; and generating reporting outputs for compliance with certification frameworks and standards comprising GRI, SASB, EU Corporate Sustainability Directive and LEED certification.

In certain illustrative embodiments, a method of standardizing and reporting sustainability data related to waste and recycling is provided. Waste and recycling data of a first party can be stored in a standardized format in at least one network-based non-transitory storage device having a collection of waste and recycling data stored thereon. Remote access can be provided to a second party over a network so the second party can update the collection of waste and recycling data in real time with waste and recycling data of the second party through a graphical user interface, wherein the second party provides the updated data in a non-standardized format based on the hardware and/or software platform used by the second party. The non-standardized updated information can be converted, by a content server, from the second party into the standardized format. The standardized waste and recycling data from the second party can be stored in the collection of waste and recycling data. A message can be generated by the content server when the standardized waste and recycling data from the second party has been stored. Sustainability waste metrics can be generated that incorporate the standardized waste and recycling data of the first party and the standardized waste and recycling data of the second party. The message can be transmitted to the second party over the computer network in real time, so that the second party has immediate access to the sustainability waste metrics and to the standardized waste and recycling data of the second party. In certain aspects, the converting of the non-standardized updated information from the second party into the standardized format comprises at least one of, or alternatively, a plurality of, or alternatively, each of: standardizing of addresses to match U.S. Postal Service standards for matching address records; standardizing of services and locations between the service provider and customer to allow reporting across customer data to material disposal data; normalization of date period of service events with frequency of services across those date periods grain for proper aggregating and reporting of metrics; standardization of types of business for comparison; standardization of vehicle fuel types; standardization of pickup vehicle types; standardization of container types; standardization of units of measure to international standard (ISO) codes; standardization of material codes/names, treatment type codes/names, treatment facility types and region code/names to map to external protocols such as comprising U.S. EPA WARM, U.S. EPA AP42, and European Environmental Agency; standardization of intensity numerators for benchmarking based on square footage, residents, or units produced; and standardization of dates to a common format.

BRIEF DESCRIPTION OF THE DRAWINGS

A better understanding of the presently disclosed subject matter can be obtained when the following detailed description is considered in conjunction with the drawings and figures herein, wherein:

FIG. 10 is an example of a logical business model of DaaS, in accordance with an illustrative embodiment of the presently disclosed subject matter;

FIG. 13 is an example of a reporting hierarchy in accordance with an illustrative embodiment of the presently disclosed subject matter;

FIG. 14 is an example of an uploadable file for a reporting hierarchy, in accordance with an illustrative embodiment of the presently disclosed subject matter;

FIG. 16 is an example of a file in a CSV Format for loading into a sustainability data hub, in accordance with an illustrative embodiment of the presently disclosed subject matter;

FIG. 17 is an example of data analysis using the sustainability data hub, in accordance with an illustrative embodiment of the presently disclosed subject matter;

FIG. 18 is an example of data analysis using the sustainability data hub, in accordance with an illustrative embodiment of the presently disclosed subject matter;

FIG. 19 is an example of data analysis using the sustainability data hub, in accordance with an illustrative embodiment of the presently disclosed subject matter;

FIG. 20 is an example of a data feed for the sustainability data hub, in accordance with an illustrative embodiment of the presently disclosed subject matter;

FIG. 21 is an example of a data feed for the sustainability data hub, in accordance with an illustrative embodiment of the presently disclosed subject matter;

FIG. 22 is an example of a CSV data feed for the sustainability data hub, in accordance with an illustrative embodiment of the presently disclosed subject matter;

Figure 1:
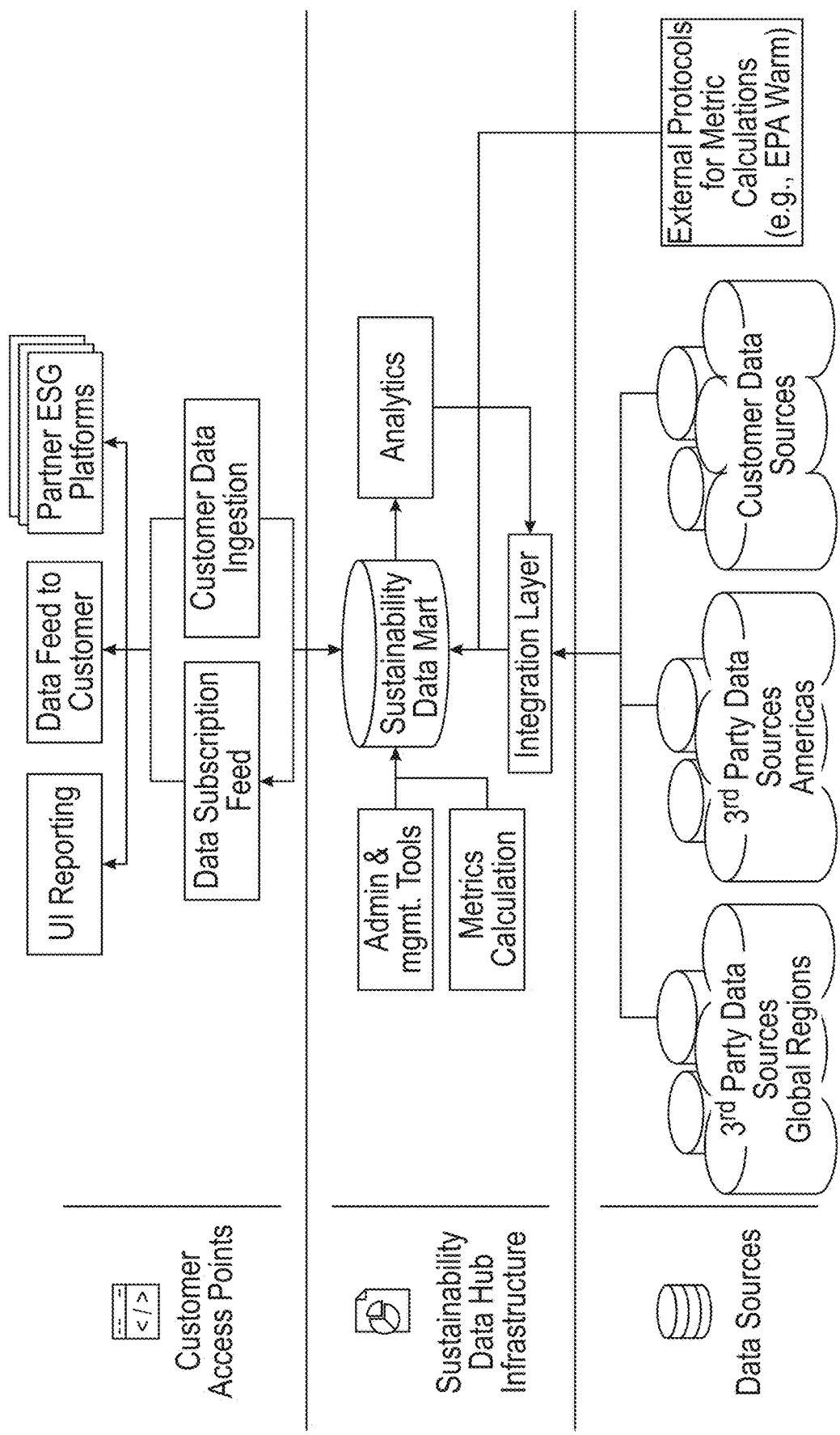
FIG. 1 is an example of a system and method for aggregating and distributing waste transaction decision models for using standardized waste and/or recycling data to facilitate decisions for waste and carbon reduction, and to enable accurate sustainability reporting, in accordance with an illustrative embodiment of the presently disclosed subject matter.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

Various illustrative embodiments of a system and method for developing c waste-related sustainability decision support models and reporting using standardized waste and/or recycling data are provided herein.

Many companies utilize multiple waste/recycling service providers for material collection, disposal and recycling services. These providers are taking various materials to different facilities and using different and unrelated measurement and reporting protocols. To be able to provide decision models and accurate reporting on all of a company's waste and recycling activities (e.g., total volume generated, volume/percent recycled, volume/percent disposed and associated emissions for all activities), data needs to be aggregated from different service providers, recycling facilities, disposal sites, and reporting systems.

Moreover, companies often do not have access to industry peer data to establish sustainable, science based performance targets. Benchmarking is key to establishing such targets and creating decision support frameworks. Benchmarking can be defined both internally by comparing different organizational units within the same organization as well as externally based on equivalent peer derived performance across different corporations.

In addition, companies are often required to report both to internal as well as external stakeholders and organizations on their emissions from waste and recycling activities, using generally recognized standards and reporting frameworks such as GRI, CDP, SASB, the European Corporate Sustainability Reporting Directive (CSRD) and California's climate disclosure rules.

Sustainability Data Hub

In certain illustrative embodiments, the presently disclosed system and method for collecting and standardizing data related to the management of waste and recyclable materials can be utilized to aggregate, analyze, display and distribute relevant sustainability decision support models, data and metrics.

As used herein, terms such as waste, recyclable material, discarded material, diverted material and the like shall generally encompass any and all types of materials in the ecosystem that can be considered for purposes of performing a sustainability analysis using the systems and methods described herein. Moreover, as used herein, terms such as waste, recyclable material, discarded material, diverted material and the like shall not be mutually exclusive from each other, and materials falling within the scope of one term may also potentially fall within the scope of another term. For example, and without limitation, plastics may potentially be categorized as a waste and also as a recyclable material.

As used herein, the term "waste" generally refers to material that has been discarded. In some cases, this may include material that is taken to a destination for permanent storage or destruction where that material is not purposed for any higher end use or reuse. Waste can also include, but is not limited to, solid waste (which may include, but not be limited to, garbage, refuse and rubbish including those which are recyclable), special waste (which may include, but not be limited to, polychlorinated biphenyl ("PCB") wastes, industrial process wastes, sludges, asbestos containing material, petroleum contaminated soils, treated/de-characterized wastes, incinerator ash, medical wastes and other materials requiring special handling in accordance with any applicable law or regulation), and hazardous waste (which may include, but not be limited to, any hazardous, toxic or radioactive substances, as such terms are defined by any applicable laws or regulations).

Waste can also include organics, which may include, but not be limited to, fruits, vegetables, bones, meat, dairy, breads, eggshells, other food wastes, non-recyclable food soiled paper, yard waste, landclearing waste, and other material which may or may not include edible material.

Waste can also include universal waste (including but not limited to batteries, mercury-containing equipment, fluorescent lamps, types of electronic waste, aerosol cans and other wastes regulated as universal waste by regulation and law).

Waste can also include regulated medical waste, which may include, but not be limited to, sharps, gauze, bandages, containers, tubing, blood, blood products, trace chemotherapy waste, tissue, specimens generated in the course of diagnosis and medical treatment or medical waste as defined by the applicable state medical waste regulations or the OSHA Bloodborne Pathogen Standard (29 CFR 1910.1030).

Typically for waste management services, specific bins or containers are pre-defined for the holding of waste material. Any material within this container is considered waste regardless of the specific material contained within. Typical examples of waste include but are not limited to non-hazardous solid waste such as food waste, household waste, construction waste, commercial waste, industrial waste, residual waste, as well as special waste and hazardous waste. Waste disposal destinations or treatment methods can include, without limitation, landfilling, recycling, composting, anaerobic digestion, waste-to-energy combustion, destructive incineration, fuels blending, production of engineered fuel, and pyrolysis/gasification.

The presently disclosed subject matter includes all types of materials in the eco-systems including waste and or recycled material that is recycled, repurposed, disposed, treated or processed, and for which data can be collected and/or for which customers want sustainability metrics to be provided.

As used herein, the phrase "diverted waste" refers to material that is diverted from disposal for a higher end beneficial use or reuse. Typically for waste management services, specific containers are pre-defined for the holding of recycling material. Material within the pre-defined container is considered recyclable material. Material identified in a container marked for recycling that is not recyclable as defined by the service is considered contamination. Recyclable material can be materials such as paper, cardboard, glass, metals, plastic. Organic (biodegradable) waste can also be identified as diverted material when the destination is identified as one for beneficial use such as composting or anaerobic digestion.

Material that can be diverted includes, but is not limited to, material type(s) such as single stream recycling, mixed recyclables, organics (food waste, yard waste, etc.), cardboard, mixed paper, office paper, metals, plastics, glass, e-waste, certain types of construction/demolition waste, etc.

Treatment methods can include, but are not limited to, landfilling, recycling, reuse, composting, anaerobic digestion, waste-to-energy, fuels blending, destructive incineration, cement kiln, deep well injection, waste water treatment, autoclave, pyrolysis/gasification, etc.

As used herein, the phrase "sustainability data" refers to and includes, but is not limited to, the following data: greenhouse gas emissions data, Scope 3 greenhouse gas emissions, emission factors, energy usage/energy savings, diversion from landfill, avoided emissions/emissions savings, landfill airspace usage savings, water usage savings, timber usage savings, customer stated sustainability goals/targets, science based sustainability goals/targets, supplier data, customer waste service pickup, time of service, location of service, container size/type/volume for discarded material, material type, volume of material, weight of material, destination of waste collected, method of transport (including type of vehicle and vehicle fuel type), distance traveled, facility type where waste is unloaded, volume of load, weight of load, date/time of unload, contamination measure, and facility attributes such as treatment method (e.g, landfill-flare, landfill-electricity generation, landfill-RNG, recycling, etc.).

A high level overview of a system and method for using standardized waste and/or recycling data to develop customized sustainability reporting, according to certain illustrative embodiments, is shown in FIG. 1 herein. The presently disclosed system and method (referred to herein as a "sustainability data hub") can be used to gather data from a plurality of data sources, integrate the data into a sustainability data hub infrastructure, analyze the data, standardize and normalize the data, and provide a customer with relevant waste related sustainability data, metrics and predictive decision support models in a standardized format via a plurality of customer access points. Data can be ingested through a visualization layer/reporting user interface ("UI") layer or directly through application programming interfaces into proprietary customer platforms or partner/other vendor environmental, social and governance ("ESG") platforms. In certain illustrative embodiments, the presently disclosed system and method can standardize data from both internal and external data sources, and offer multiple customer access points, which will provide a scalable, holistic set of services and infrastructure to enable insight generation, allow ingestion across industry data sources, and enable customers to consume data in the way that drives sustainability impact within their organizations.

FIG. 1 displays an architecture stack from data ingestion to customer access, according to certain illustrative embodiments. The base of the architecture is the ingestion of data sources. Data sources are independent systems where information has been previously created or centralized. Computer processes are created to ingest the output of these systems for input into the sustainability data hub. All data source ingestion layouts are done in predefined standard formats that are agnostic to individual organizations and represent an industry standard of data needed for greenhouse gas emissions metrics and other sustainability metrics and decision models associated with waste. The data sources can be centralized into an internally developed or commercially available cloud data warehouse for data storage. A data exchange of shared data tables is created which allows the sharing of these tables with the sustainability data hub. For third party data sources, multiple methods are provided to allow ingestion from their sources. These can include data sharing, APIs, and/or S3 ingestion of CSV files. Other third party sources can include, but are not limited to, hauling service pickup and disposal data, third party material processing site data, customer hierarchy data, customer sustainability target data, customer intensity metrics data, customer fiscal calendar data, EPA density and emission factors from U.S. EPA, and other accredited governmental or industry sources.

In certain illustrative embodiments, the data is loaded into an integration layer where functions of validation, consolidation and conformance are applied to prepare the data for loading into the data mart for the sustainability data hub. The data mart is a service based software database that resides on a cloud platform. The sustainability data hub infrastructure can contain data for decision support analysis frameworks and reporting, managing functionality and customer behavior and interaction, security, subscribed services, data mappings from organizations to services to greenhouse gas emissions and other calculations, auditing of usage, logging of process executions and analytical models. Centralization of the data and a common presentation layer within the data mart allows for maintaining a consistent standardized metric output for data consumption by customers. The presented data is available for consumption through differing customer access points via a feed defined by a data subscription or a direct ingestion of customer data at run time. The data can be channeled to the customer via a reporting user interface provided by the sustainability data hub, a data feed sent through an application programming interface ("API"), or through third party ESG application platforms that consume API data feeds from the sustainability data hub.

In certain illustrative embodiments, the plurality of data sources can include, for example, internal data sources and external data sources.

As used herein, the phrase "internal data source" refers to and includes, but is not limited to, the following data: truck route operations that collect waste material from customer locations at specific times, customer serviced location coordinates, scale data at facilities that includes time stamp and tonnage of waste or recycling materials unloaded, truck camera video data showing collected waste and recycling materials, presence and volume of contamination, landfill greenhouse gas emissions data and estimates, secondary journey of waste from intermediate facilities (such as transfer stations) including mileage, destination facility, data on mode of transport, including type of transportation vehicle and fuel used, and data on material and treatment types.

As used herein, the phrase "external data source" refers to third party data sources such as data sourced from any company that operates a business that collects waste and recycling from customers and transports it to a disposal or treatment facility site. The external data source can include, but is not limited to, customer service location, waste material type, disposal and treatment method, weight data and contamination, and final destination treatment facility. An "external data source" can also refer to data provided by the company that is using the presently disclosed system and method, and includes, but is not limited to, customer data such as reporting hierarchies, locations of waste services, future goals for sustainability measures and intensity metric definitions such as facility square footage or units produced. Data published by accredited organizations such as the U.S. Environmental Protection Agency on factors to be used in the calculation of waste density and emissions associated with waste is another example of an external data source that can be used.

In certain illustrative embodiments, the presently disclosed system and method are configured for: (i) data aggregation, integration calculations and visualization; (ii) decision support models for setting and visualizing of sustainability performance targets; and (iii) competitive benchmarking, as described below.

(i) Data Aggregation, Integration Calculations and Visualization

In certain illustrative embodiments, improvements in data aggregation, integration calculations and visualization of a total waste profile for users are provided. Data can be aggregated from one or more internal and external data sources, including external third party data sources, and from other external data sources (e.g., the U.S. Environmental Protection Agency (EPA)) through APIs and other means to enable the calculation of an organization's waste and emissions profile.

In certain illustrative embodiments, the presently disclosed system and method can provide a user/organization with visualizations of critical current and historical waste data, in a standardized format, which can: (i) enable the user to understand the organization's waste volume associated with disposal and different treatment methods along with its estimated emissions footprint; (ii) enable the user to drill down into the organization's locations to determine a specific waste and emissions footprint associated with waste using a unique hierarchical system to organize data; (iii) generate reports and integrate data into third party reporting platforms; and (iv) estimate and aggregate the organization's emissions associated with waste.

In certain illustrative embodiments, the data aggregation, integration calculations and visualization of a total waste performance profile can include (without limitation) one or more of the following features:

(1.) Ingestion of data from raw sources using transformation and replication technologies into a central data lake environment.

(2.) Replication/copying of data over multiple environments for schema validation and cleansing purposes aggregating data into an STG (staging area) zone.

(3.) From the STG (staging area) zone, clean data can be ingested into an ODS (operating data store) zone which contains the latest version of a given transaction along with a historical view of data.

(4.) Ingested data is integrated and processed per business transformation and mapping rules. Rules are ways in which data is joined together or waste metrics are defined. Some of these rules include ensuring all defined service locations are in both the waste service event data and the customer service location definition. Rules ensure that container volume data always has an associated standard pre-defined unit of measure such as yardage or gallons and unit of measure conversion rules are applied to allow the user to view weight-based data in metric vs. short tons for example. Rules ensure that mappings exist to convert to a predefined set of libraries for material type and treatment method.

Figure 2:
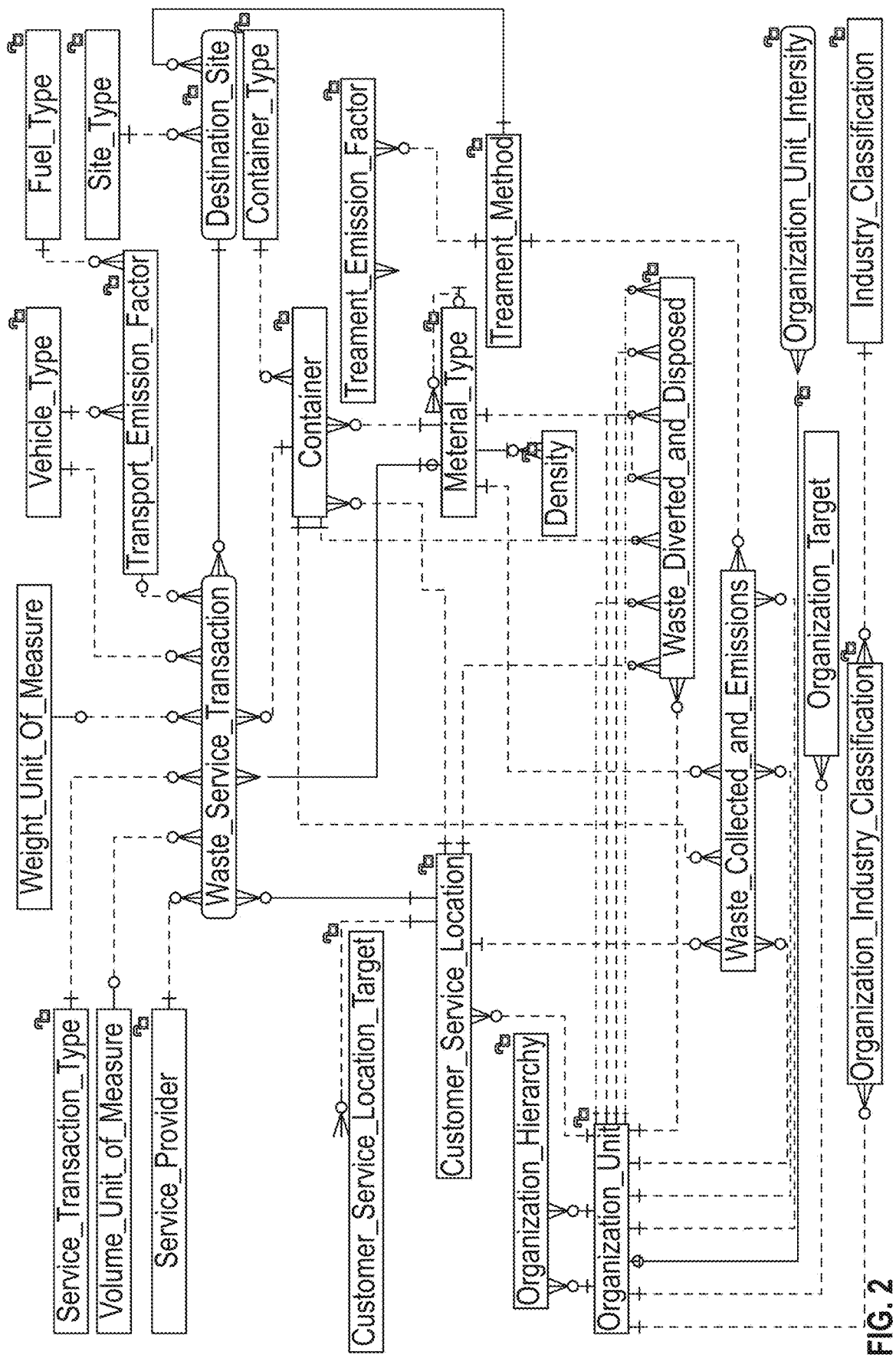
FIG. 2 an example of waste data transaction records being aggregated into a single waste data transaction logical model, in accordance with an illustrative embodiment of the presently disclosed subject matter.

(5.) As shown in FIG. 2, large amounts (e.g., millions) of waste data transaction records can be aggregated into a single waste data transaction logical model using one or more common data organization and coding standards, such as (without limitation) the following: (i) service location; (ii) pickup service transaction type; (iii) waste transportation; and (iv) waste destination.

(6.) In the case of multiple client waste/recycling collection services, client-specific waste volumes and associated environmental footprint metrics can be calculated using multiple data types/sources, both from internal systems of record and external.

Figure 28:
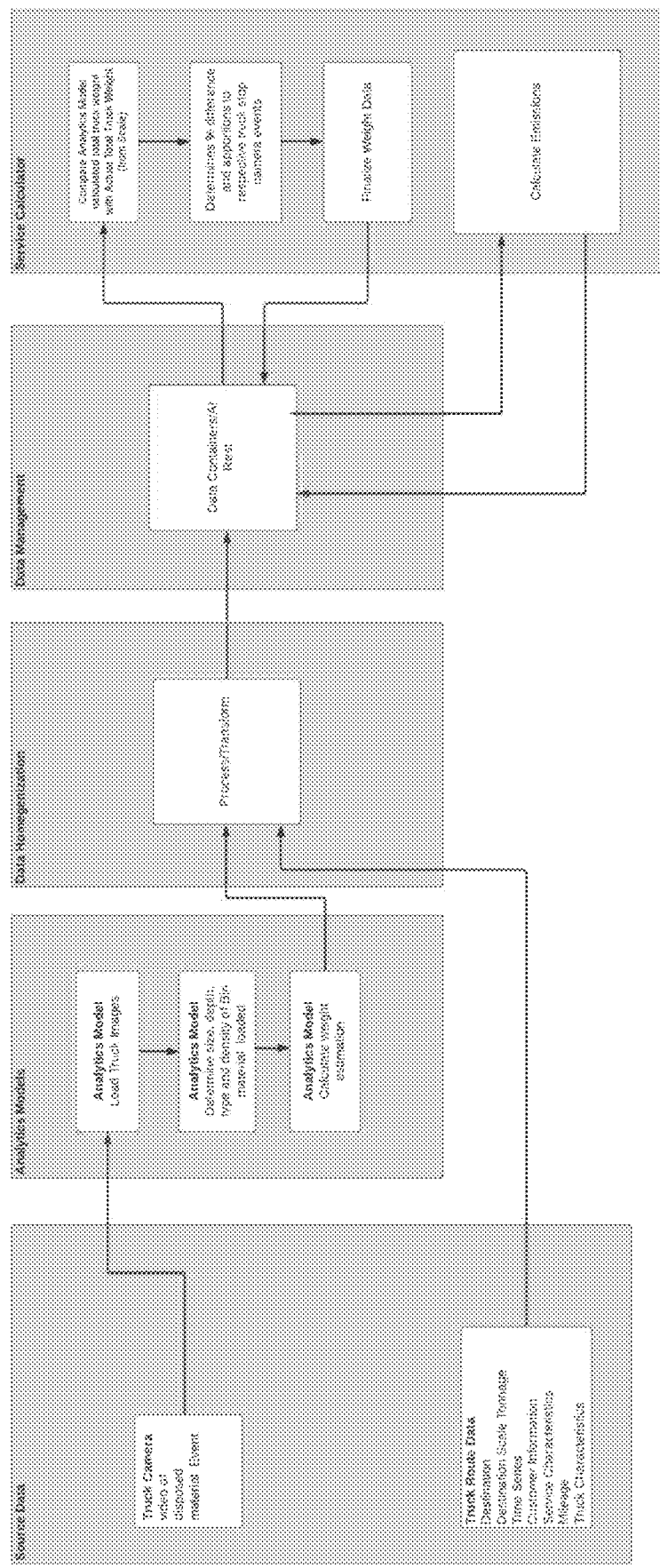
FIG. 28 is an example of an analytics model application for waste material weight estimation, in accordance with an illustrative embodiment of the presently disclosed subject matter.

(7.) In certain illustrative embodiments, such as shown in FIG. 28, waste volumes can be calculated based on actual data transaction records and recordings from various types of recording devices with software programming interfaces recording actual weights and material types disposed as well as based on image stream analysis and the application of artificial intelligence ("AI") algorithms to confirm material type and volumes and to estimate associated material weights. In certain illustrative embodiments, material weight is critical in determining the actual amount of waste disposed, diverted or the emissions associated with those scenarios. In some cases, actual truck and material weights are available as a recording from a scaling device and that reading can be directly ingested as raw data. In other cases, a physical weight recording is not available. In those cases, image data captured though multiple cameras positioned on the truck when waste is being loaded can be used to derive composition and volume estimations.

In certain illustrative embodiments, material weight is critical in determining the actual amount of waste disposed, diverted or the emissions associated with those scenarios. In some cases, actual truck and material weights are available as a recording from a scaling device and that reading can be directly ingested as raw data. In other cases, a physical weight recording is not available. In those cases, image data captured though multiple cameras positioned on the truck when waste is being loaded can be used to derive composition and volume estimations.

Waste volumes can be calculated based on actual or derived data transaction records and recordings from various types of recording devices with software programming interfaces recording actual weights and material types disposed as well as based on image stream analysis and the application of AI algorithms to confirm material type and volumes and to estimate weights.

The presently disclosed system and method allow for the calculation of client specific waste volumes by waste stream and treatment method, mileage to treatment destination facilities, and emissions associated with different treatment options for the locations associated with specific organizational entities across multiple sources of data, both from internal systems of record and external. These estimations in combination with actual weight data from similar routes can be used to generate a set of proprietary density factors. The density factors may then be used along with service frequency to derive an accurate estimation of weight.

Figure 8:
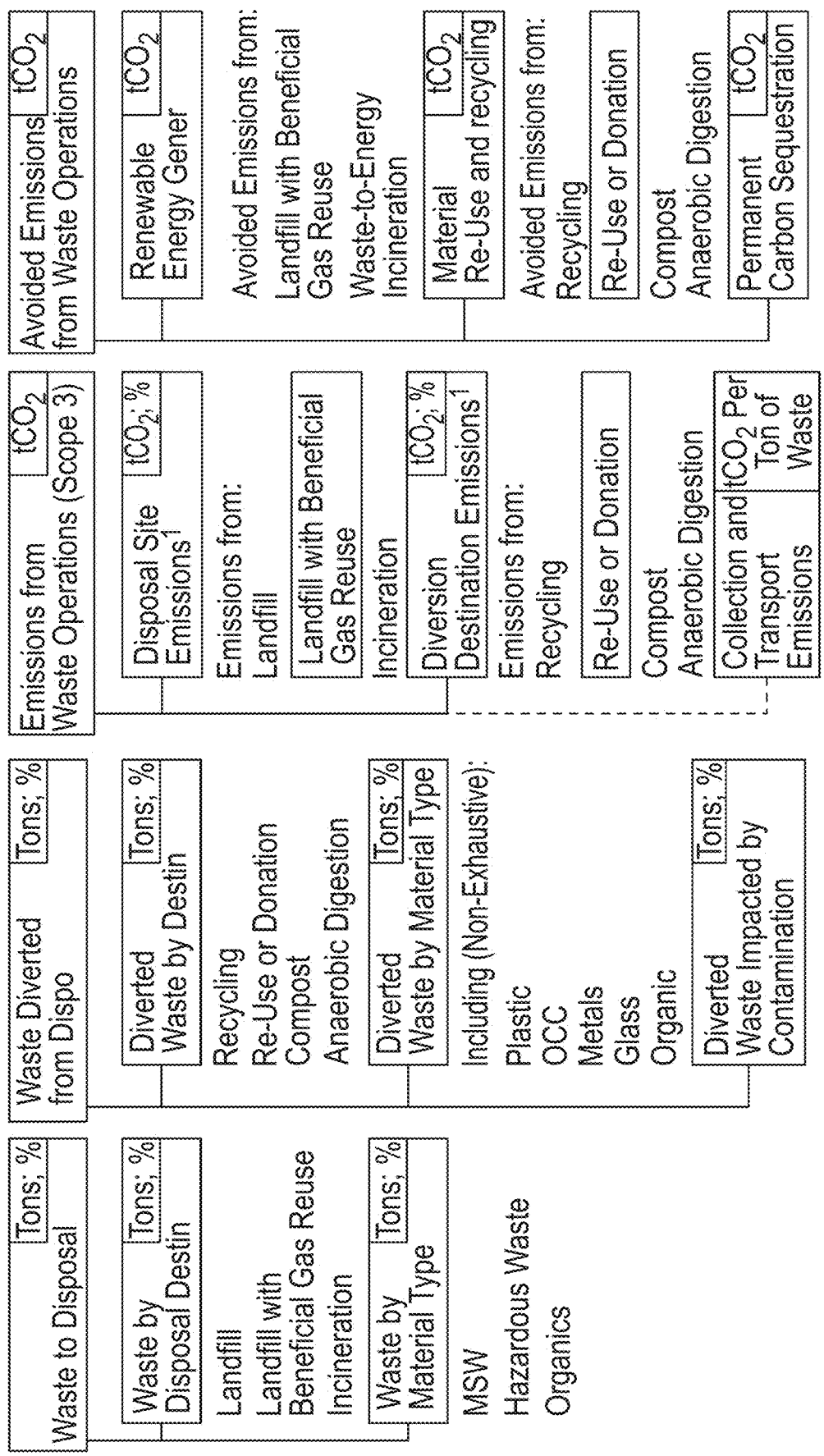
FIG. 8 is an example of linking of waste and emissions data, in accordance with an illustrative embodiment of the presently disclosed subject matter.

Once weight is determined, the presently disclosed system and method can calculate how much of a certain waste material is disposed (via landfill treatment or destructive incineration) or diverted (to other treatment methods such as recycling, anaerobic digestion or composting). A combination of industry available and proprietary emissions factors can be used to determine the emissions associated with each scenario. Industry available factors from governmental agencies such as the U.S. EPA GHG emissions database, the EPA's LMOP National Emissions Map, and the European Environmental Agency can be used. In addition, actual emissions data from transportation fleets, landfills and incineration facilities can be incorporated. The derived emissions factors can be used in determining actual emissions associated with waste. See, for example, FIG. 8.

(8.) Greenhouse gas emissions can be estimated based on a combination of industry standard emissions factors from accredited sources such as the U.S. Environmental Protection Agency (EPA) or the European Environmental Agency (EEA), and greenhouse gas emissions measurements.estimates for specific modes of transport and for different types of landfills, for example, a renewable natural gas (RNG) producing landfill vs. a landfill that flares the landfill gas.

Figure 3:
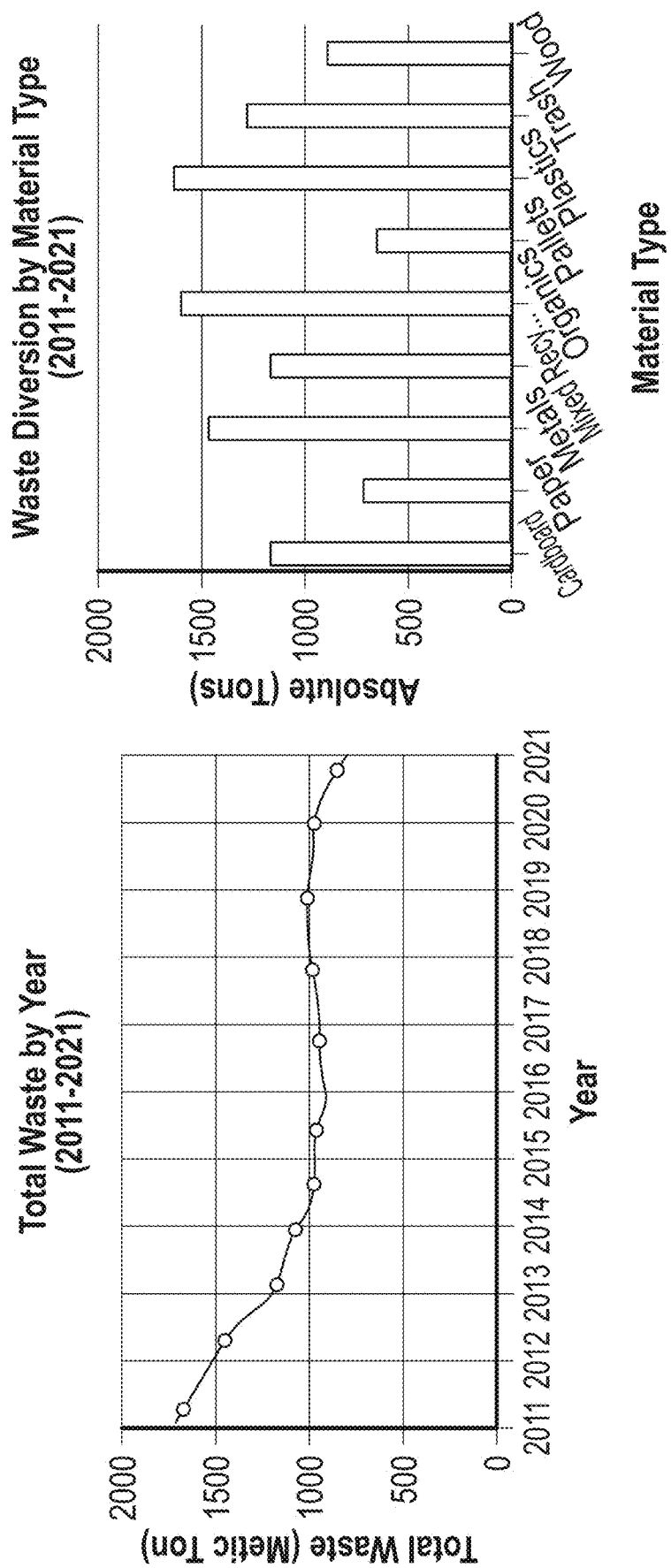
FIG. 3 is an example of data being made available as a visualized total waste profile, in accordance with an illustrative embodiment of the presently disclosed subject matter.
Figure 12A:
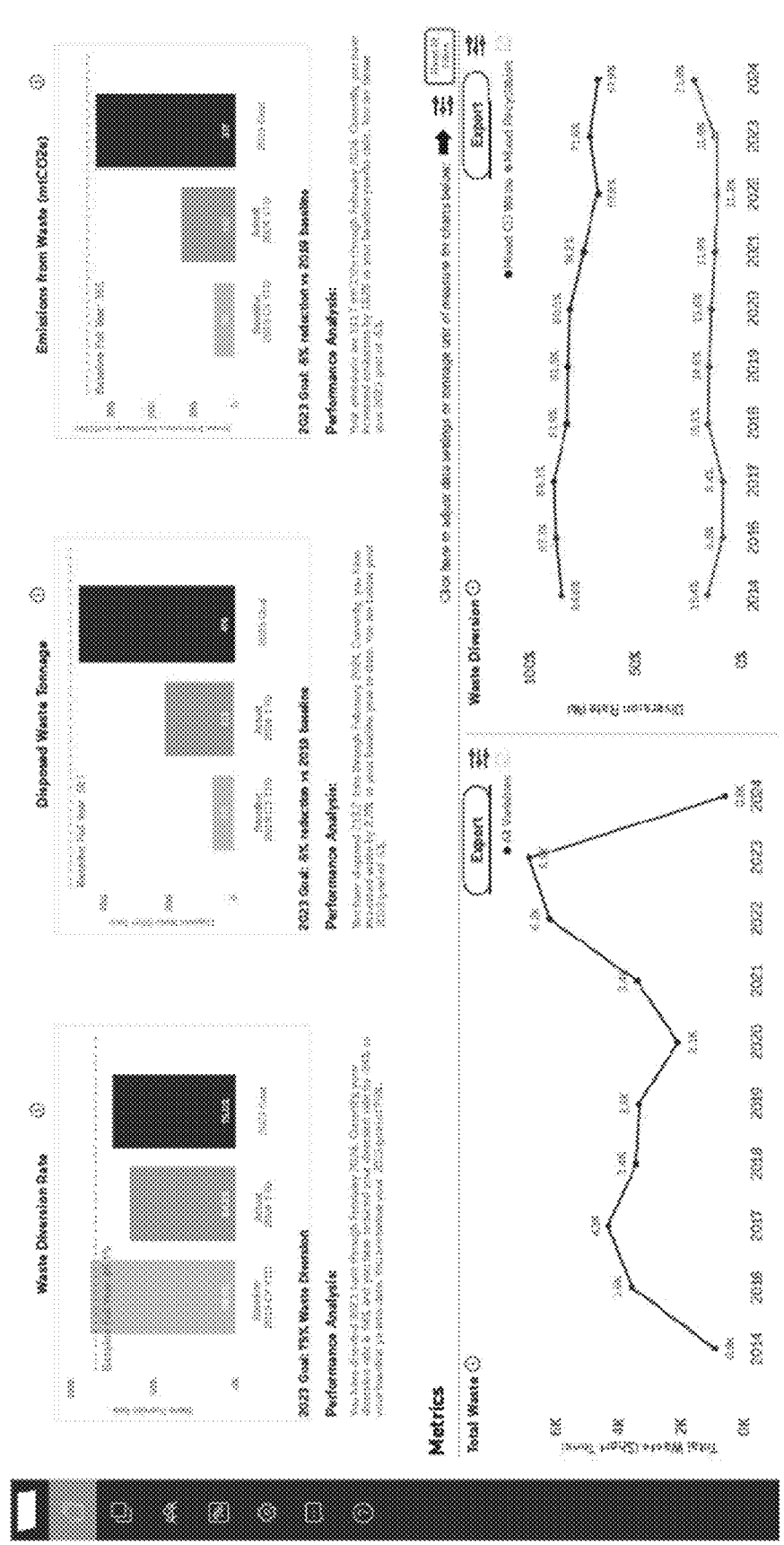
FIG. 12A is an example of a user facing display visualizing total waste performance, in accordance with an illustrative embodiment of the presently disclosed subject matter.
Figure 12B:
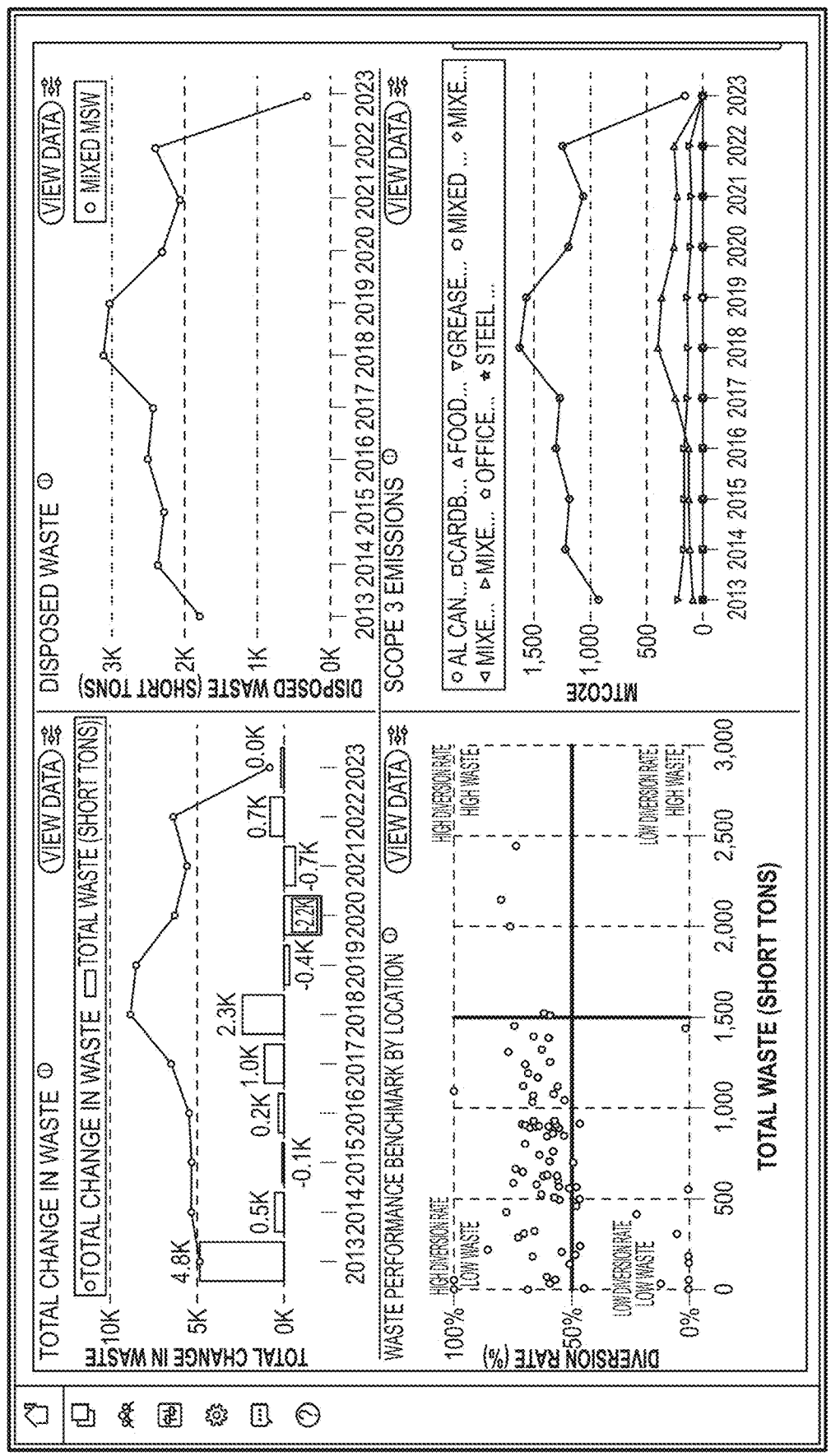
FIG. 12B is an example of a user facing display visualizing total waste performance, in accordance with an illustrative embodiment of the presently disclosed subject matter.

(9.) In certain illustrative embodiments, such as shown in FIG. 3, FIG. 12A, and FIG. 12B, the data can be made available as a "visualized total waste profile," e.g., in a semantic layer from which the data can be sourced for visualizations of total waste metrics for current and historical waste data. Visualization allows a unique way to display waste data by disposal weight and treatment method for all waste streams to analyze a company's waste profile. The dashboard of visualizations can be specific to the user and can be configured with the user's preferences for specific visualizations. Aggregated data can be made available through the integration, and then semantic layers can also be available for visualization of a total waste profile, such as (without limitation) the following: (i) total waste by year/by quarter/by month; (ii) total waste by waste stream (MSW, cardboard, food waste, etc.); (iii) total waste adjusted by user-selected intensity metrics such as facility square footage, number of units produced, number of transactions or revenue; (iv) waste diverted shown by material type (plastics, paper, cardboard, food, etc.) and treatment method (recycling, composting, etc.); and (v) waste to landfill.

In certain illustrative embodiments, a method of standardizing and reporting sustainability data related to waste and recycling is provided. Waste and recycling data of a first party can be stored in a standardized format in at least one network-based non-transitory storage device having a collection of waste and recycling data stored thereon. Remote access can be provided to a second party over a network so the second party can update the collection of waste and recycling data in real time with waste and recycling data of the second party through a graphical user interface, wherein the second party provides the updated data in a non-standardized format based on the hardware and/or software platform used by the second party. The non-standardized updated information from the second party can be converted, by a content server, into the standardized format. The standardized waste and recycling data from the second party can be stored in the collection of waste and recycling data. A message can be generated by the content server when the standardized waste and recycling data from the second party has been stored. Sustainability waste metrics can be generated that incorporate the standardized waste and recycling data of the first party and the standardized waste and recycling data of the second party. The message can be transmitted to the second party over the computer network in real time, so that the second party has immediate access to the sustainability waste metric and to the standardized waste and recycling data of the second party. The converting of the non-standardized updated information from the second party into the standardized format can comprise at least one of: standardizing of address to match U.S. Postal Service standards for matching address records; standardizing of services and locations between the service provider and customer to allow reporting across customer data to material disposal data; normalization of date period of service events with frequency of services across those date periods grain for proper aggregating and reporting of metrics; standardization of types of business for comparison; standardization of vehicle fuel types; standardization of pickup vehicle types; standardization of container types; standardization of units of measure to international standard (ISO) codes; standardization of material codes/names, treatment type codes/names, treatment facility types and region code/names to map to external protocols such as U.S. EPA WARM, U.S. EPA AP-42, and European Environmental Agency; standardization of intensity numerators for benchmarking based on square footage, residents, or units produced; and standardization of dates to a common format.

(ii) Set and Visualize Sustainability Performance Targets

Figure 4:
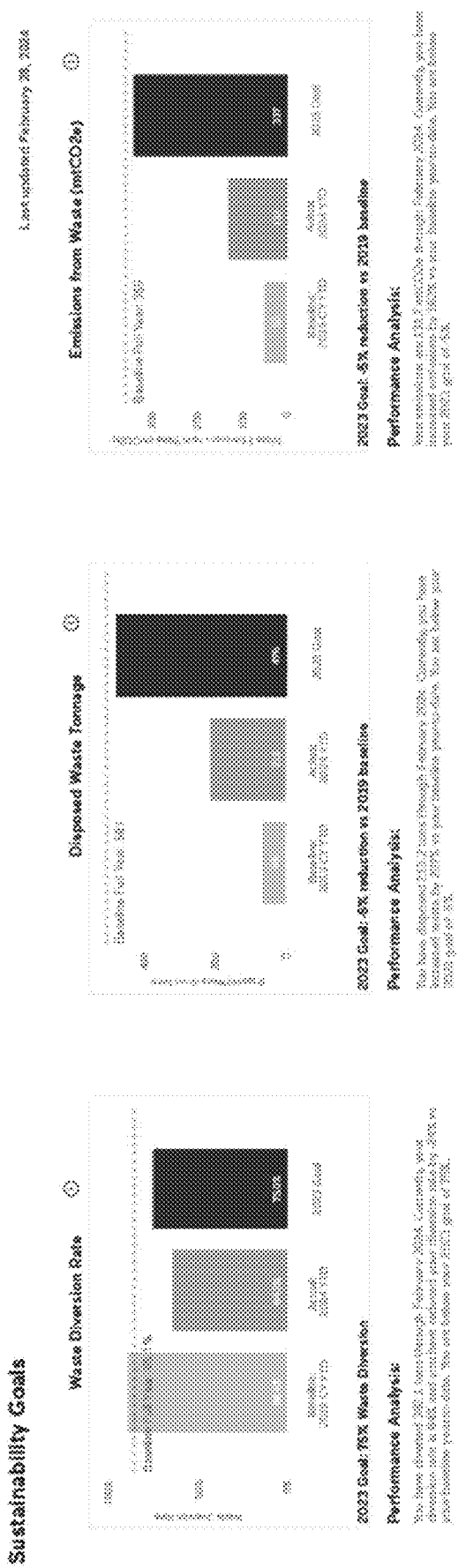
FIG. 4 is an example of sustainability performance targets for key sustainability metrics associated with waste and/or recycling being set and displayed, in accordance with an illustrative embodiment of the presently disclosed subject matter.

In certain illustrative embodiments, such as shown in FIG. 4, sustainability performance targets for key sustainability metrics associated with waste and/or recycling can be set and displayed. For example, users can set start and target dates and the presently disclosed system and method can utilize real time waste/recycling data from an aggregate repository of raw data sources to determine and suggest future targets on, e.g., diversion, waste reduction and greenhouse gas ("GHG") emissions, using predictive analytics algorithms. The targets can be continuously configured based on suggested inputs. Company waste and GHG emissions data can be tracked against the targets to show actual performance. Results are displayed to allow users to instantly evaluate current state and determine if action is needed. Instant data downloads allow users to incorporate data into internal and external reporting. Targets can be provided on different hierarchy reporting levels, for example for a specific site, region or functional business segment.

Figure 29:
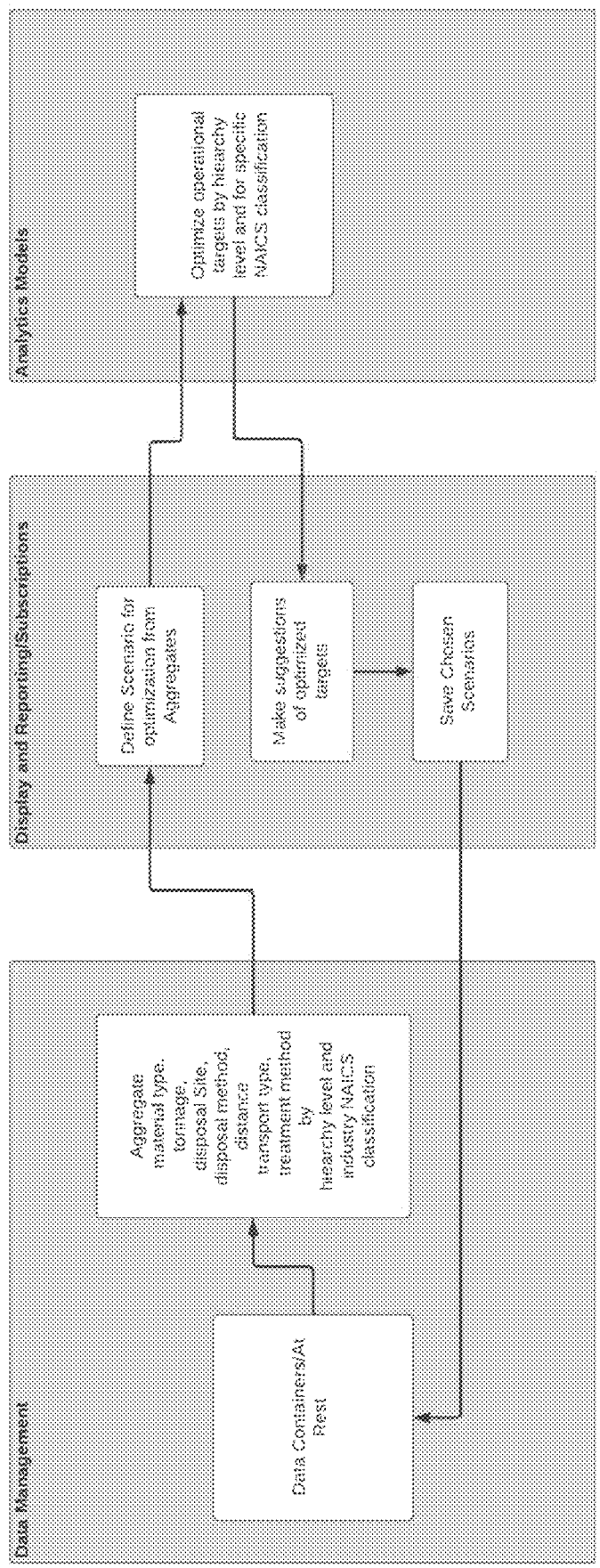
FIG. 29 is an example of a decision model for sustainability target optimization, in accordance with an illustrative embodiment of the presently disclosed subject matter.

In certain illustrative embodiments, such as shown in FIG. 29, the presently disclosed system and method utilize numeric value prediction based on historical data analysis of waste categories grouped based on North American Industry Classification System ("NAICS") and observed in the specific organization's waste profile or other, anonymized organizations waste profiles, by hierarchy level, where waste categories are represented by specific material types and correlated to their disposal and the available volume and tonnage data.

(iii) Competitive Benchmarking

In certain illustrative embodiments, competitive benchmarking can be utilized across internal company locations and across different external organizations in similar industry classifications to compare waste profiles between locations based on a unique method of hierarchical data organization.

In certain illustrative embodiments, the hierarchical data organization is structured based on one or more of the following seven levels relevant to the waste/recycling industry: (i) enterprise; (ii) line of business; (iii) function of business; (iv) business sub-function; (v) service location; (vi) sub-facility; and (vii) container. These levels allow comparing of company locations across a certain hierarchical level, for example, business sub-function, and based on specific waste metrics such as, for example, waste diversion and total waste for the purpose of performance target setting.

Figure 5:
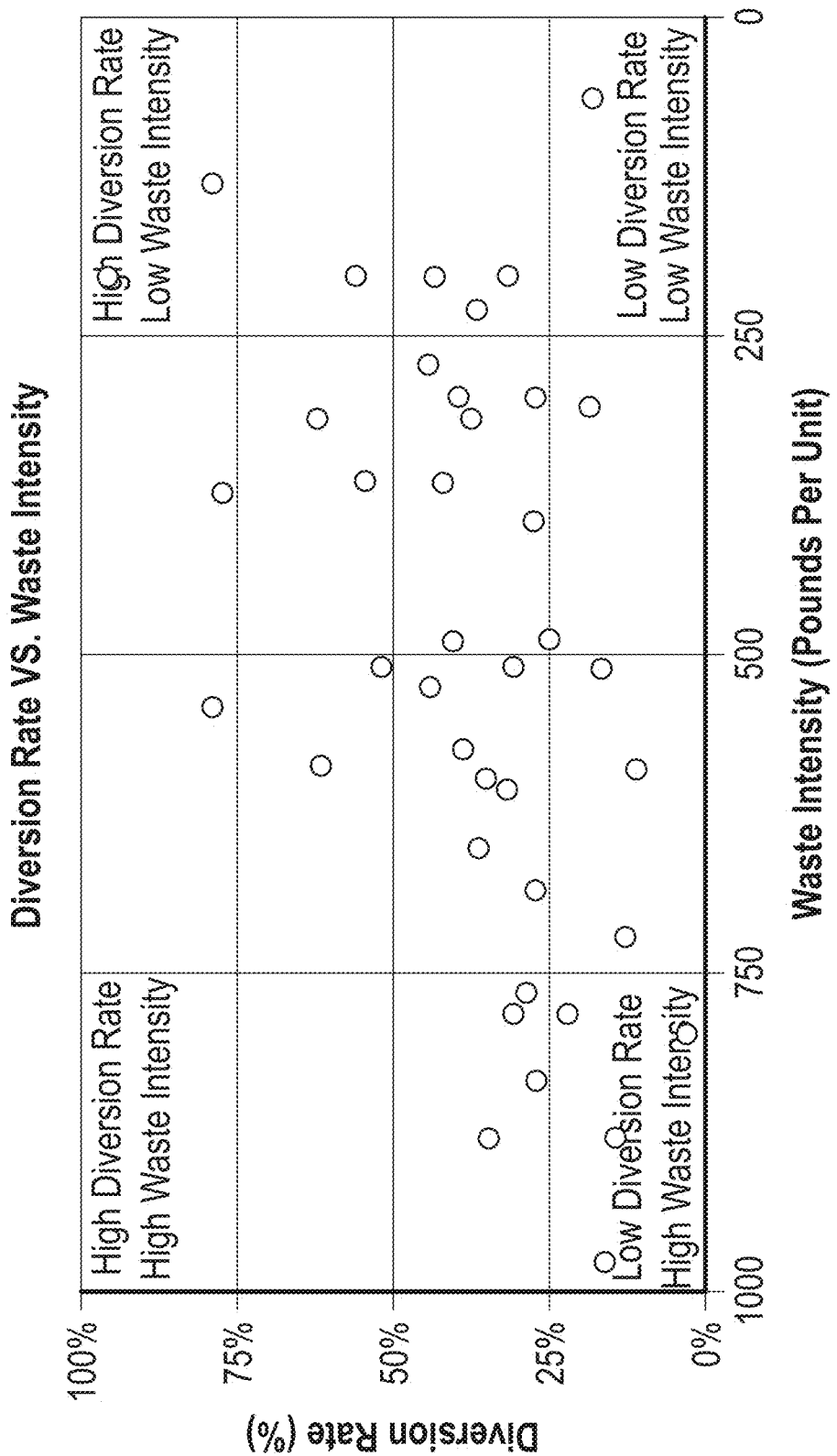
FIG. 5 is an example of visualizations being provided on a user-facing display, in accordance with an illustrative embodiment of the presently disclosed subject matter.

In the illustrative embodiment shown in FIG. 5, visualizations can be provided on a user-facing display that allows a user to quickly identify high vs. low performing locations based on waste sustainability metrics. Based on the hierarchies set on individual organizational levels, data can be anonymized and aggregated to a common structure to derive an average by industry and a hierarchy level.

Figure 6:
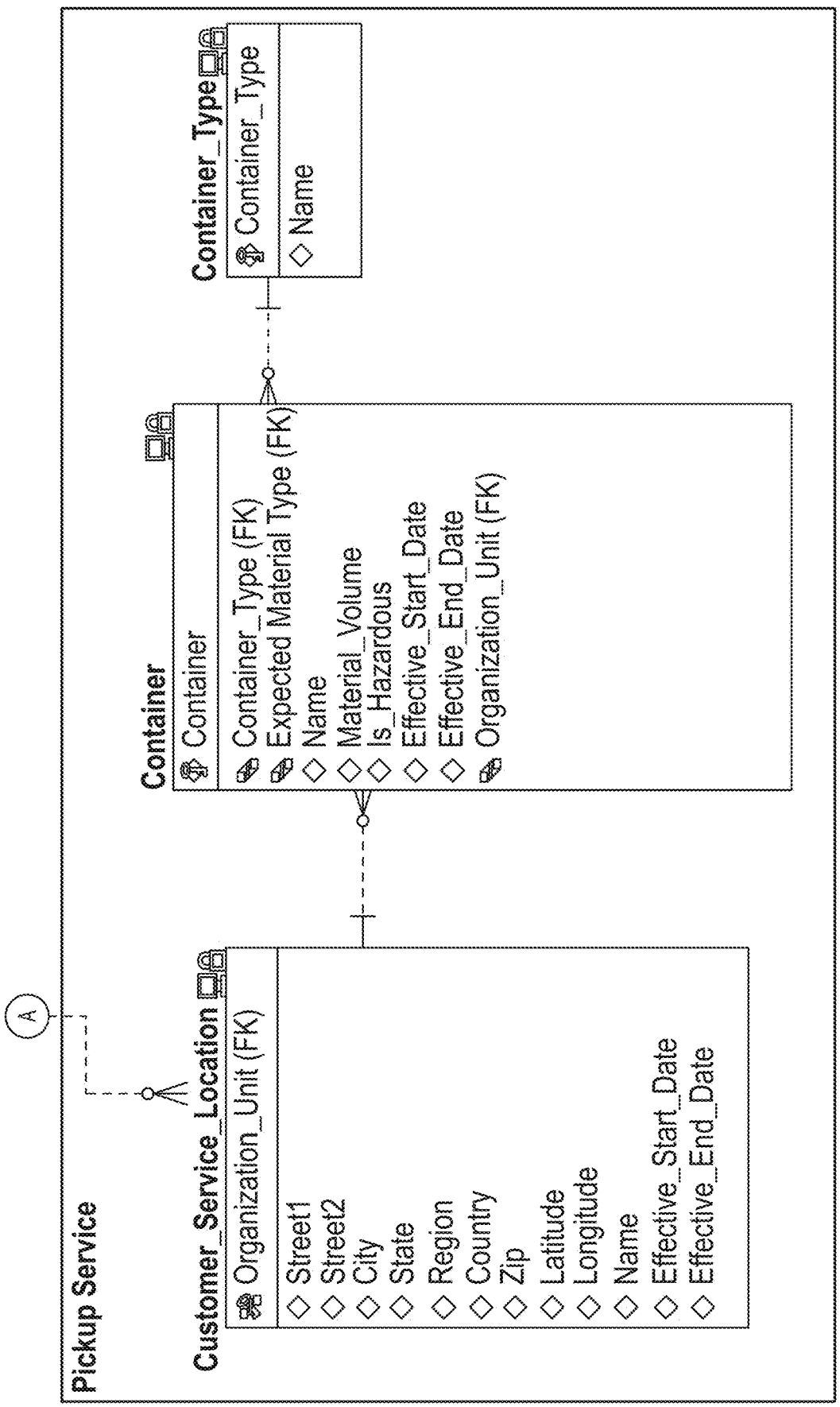
FIG. 6 is an example of hierarchy data sets, in accordance with an illustrative embodiment of the presently disclosed subject matter.
Figure 6:
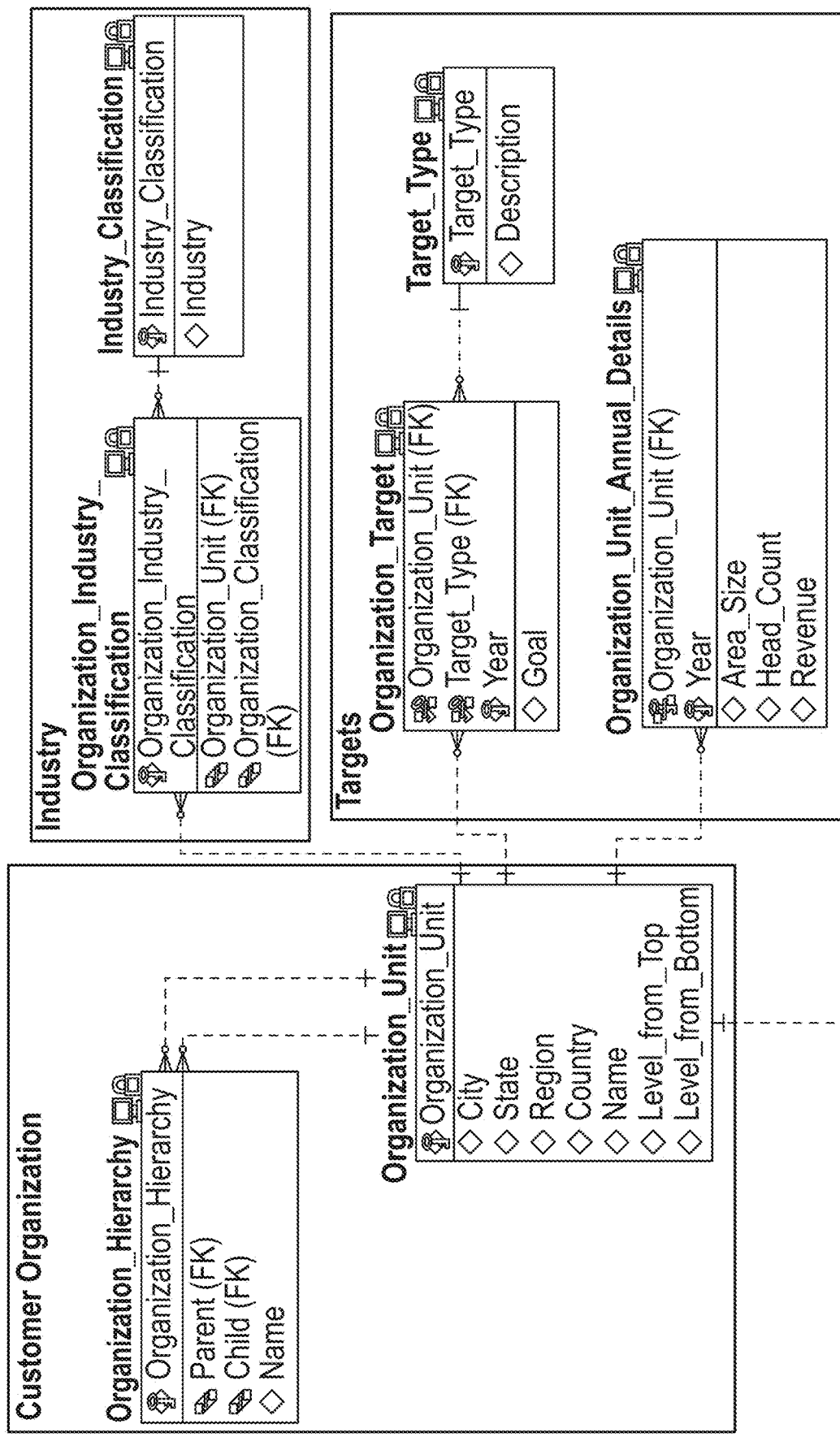

Examples of hierarchy data sets are shown in FIG. 6. Comparisons can be made based on industry classifications, such as the North American Industry Classification System ("NAICS") code and one or more of the hierarchical levels. A common anonymized data model is used to store all hierarchical data.

Figure 7:
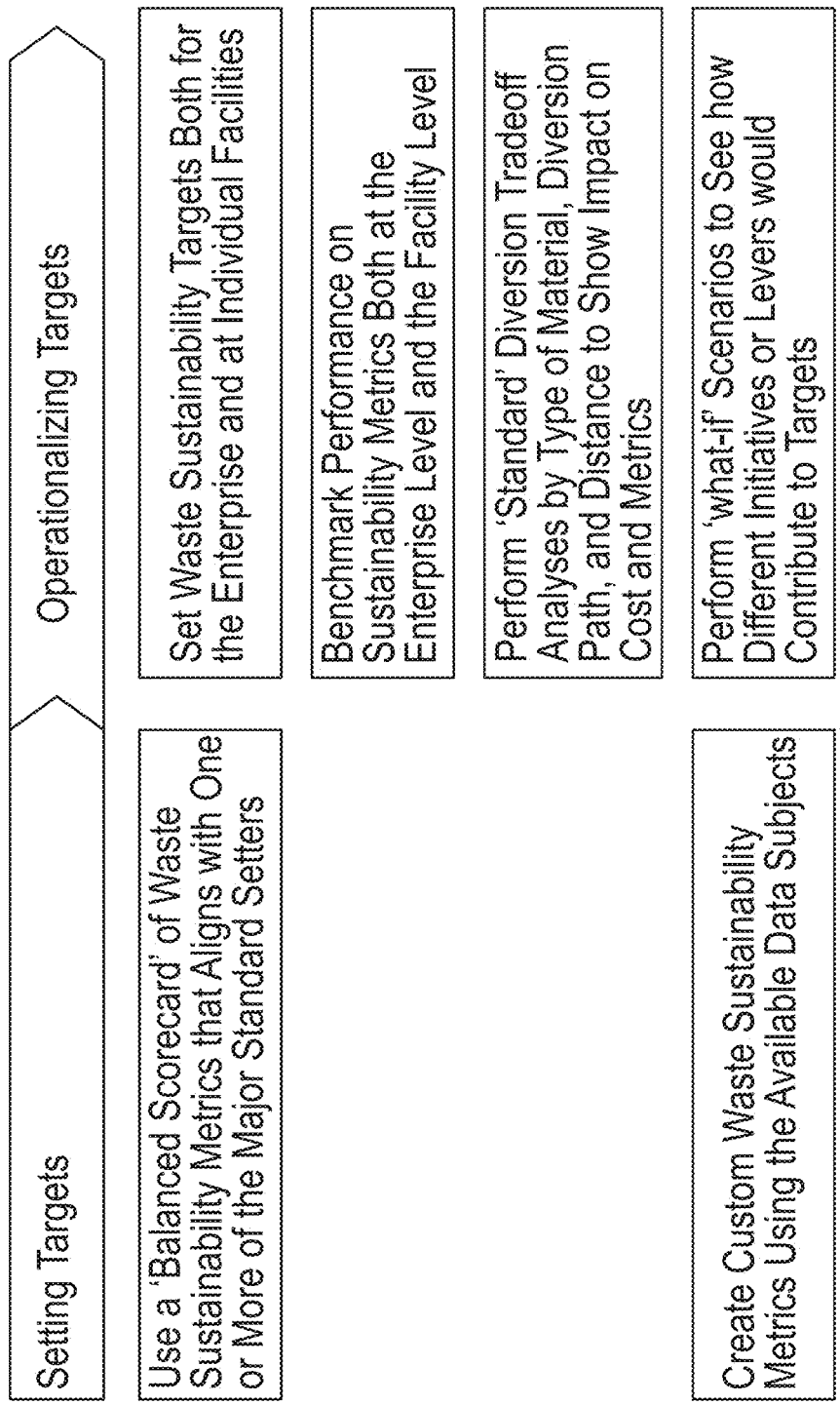
FIG. 7 is an example of metrics displays for users, in accordance with an illustrative embodiment of the presently disclosed subject matter.
Figure 7:

As shown in the illustrative embodiment of FIG. 7, the presently disclosed system and method can enable key insights for users on metrics such as, without limitation, setting targets, operationalizing targets, tracking and managing sustainability programs, and preparing external reports, in certain illustrative embodiments. By analyzing requirements of differing types of industry lines of businesses, patterns for those targets are identified, standardized and made available to all clients within that line of business. Businesses are then able to set targets within the pre-defined client hierarchy service level and above. These targets are then compared to actual performance numbers for the setting and reporting on their sustainability program. Waste sustainability performance reports for company internal and external stakeholders are available to be extracted and used. Reports provide detailed data on actual waste performance against set sustainability targets and improvement suggestions. Detailed data on actual waste performance can include, for example, total waste disposed to landfill or using destructive incineration, total waste diverted using methods such as recycling, composting, anaerobic digestion, or other beneficial reuses such as donation or repurposing. The presently disclosed system and method can offer recommendation scenarios to the user that would improve diversion rate by suggesting materials that can be diverted. For example, the presently disclosed system and method can state how a certain material (for example plastic or cardboard) currently goes to landfill and can be diverted. The presently disclosed system and method can also calculate the savings generated by the use of material diverted from disposal in terms of avoided natural resource use or avoided GHG emissions. The calculation can be performed using existing methods and factors such as those utilized in the U.S. EPA waste reduction model ("WARM") tool.

High Performing Sustainability as a Service Environment

Figure 9:
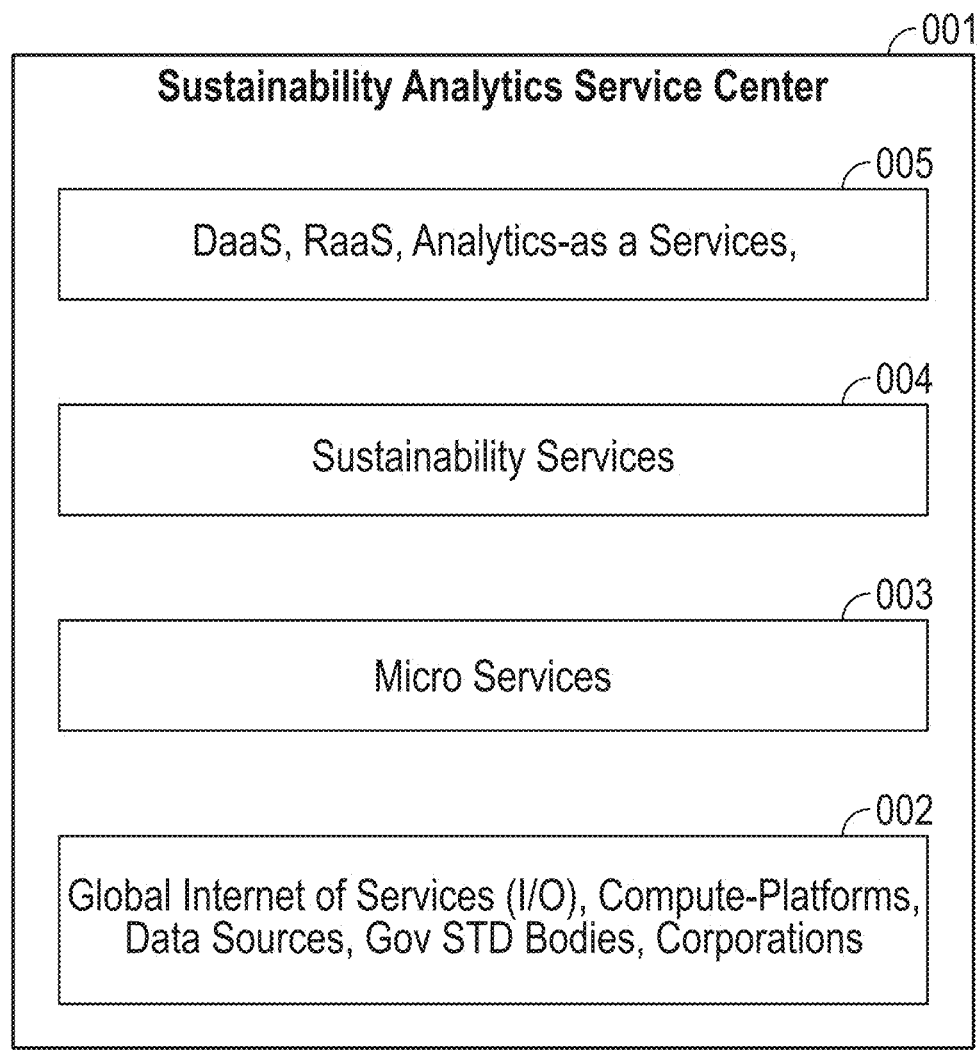
FIG. 9 is an example of building blocks of applications made up of code and a computing platform, in accordance with an illustrative embodiment of the presently disclosed subject matter.

FIG. 9 shows an example of a building block of applications made up of code and a computing platform for the presently disclosed system and method, in certain illustrative embodiments. Block 002 shows a base with the ability to connect and use the Internet, have a computer platform in which to execute algorithms, an ability to store and retrieve data, a concept of organizational identification of private or public, and the regulatory government measure and rules. Block 003 represents micro services created based upon the foundation supplied by Block 002. Block 004 shows the services that are made available to sustainability data reports, propagate processed data to end-users, and analytics that are built with those micro services. Block 005 shows the final product that provides DaaS, RaaS, and Analytics-as-a-Service. As used herein, the phrase "as a Service" describes a cloud based software that is created for providing some type of service, typically for a fee. As used herein, the term DaaS means "Data as a Service," the sustainability data hub product that supplies sustainability data on demand based upon a concept of sharing, selling, or trading information it has sourced. As used herein, the term "RaaS" means "Reporting as a Service," which describes a cloud based software service where reports and dashboards are presented to the subscriber. These reports can either be user created or pre-defined by the service provider. As used herein, the phrase "Analytics as a Service" means the ability to run algorithms against the sustainability data to provide deeper insight on the data by finding meaningful patterns using computation and statistical models and calculators.

In certain illustrative embodiments, as shown in FIG. 10, the presently disclosed system and method can provide the DaaS, RaaS and Analytics as a Service via a framework that provides access from producer to consumer built on algorithms and practices made up of one or more of service constructors, transportation event analytics, graphic constructors, service calculator, data management, data homogenization, crawler, service deployment, display and reporting, analytics and subscription including all related functionality while also continually and in real time maintaining an authenticated and secure environment.

FIG. 10 is a logical business model of DaaS for the sustainability data hub. In certain illustrative embodiments, there are multiple categories organized as functional capabilities where each group can invoke part or all of the services that each represents to facilitate the specific collective functionality it offers. Each offer can be realized as a service-offering using API materialized by micro-service capability. The following describes each functional block:

(1) Continuous Real-time Authentication. In certain illustrative embodiments, this is an ingress/egress security interface layer for all access to and from the sustainability data hub. It can continuously employ state-of-the-art security protocols, processes, policies, and proactive monitoring to authorize access to the sustainability data hub whether machine or human. It can be updated continuously in real time, and can interface to contained or separate security platforms that guarantee AAA (authorization, authentication, accounting). Representative examples of such platforms are commercially available from providers. As data is imported or exported to the sustainability data hub, the AAA service validates access. This security layer interoperates with the consumer/producer profile to ensure all ingress and egress access rights, machine and human alike, are substantiated. This functional block element can be interoperable with the security alert and monitoring support processes.

(2) Consumer/Producer Access Profile. In certain illustrative embodiments, this module contains all the relevant information for all the sustainability data hub users that are either machine, human, and/or a corporate entity. The profile is a data repository built using various database implementation technologies, e.g., standard relational, object model or key value pair representation, or some other form. The purpose of this data repository is to maintain a separate access rights and privilege function per user suite. All the functional blocks in FIG. 10 can use this repository to determine what functions can be accessed and used. Information kept for each individual entry contains an array of data such as name, contact information, level of access provided with access and 'run' privileges per functional area. An example of access rights would be a producer versus a consumer. Producers can publish new or depreciated services or APIs, while consumers cannot. Some entities can be one or the other or both. The sustainability data hub super administrator controls and manages access to the profiles. All users can run reports against the profile that they are a member of by corporation, division, or department as controlled by their profile make up and AAA configuration. The sustainability data hub super users can access any profile report capability.

(3) Service Constructors. In certain illustrative embodiments, this module is used by producers to manage APIs or services. It provides a set of capability that enables producers to manage existing services and obtain statistics regarding performance of each or collectively, i.e., usability and service level agreement compliance, throttle volume processing and simultaneous usage. It offers functions to publish, remove, depreciate or suspend APIs. Two functions are provided to publish or remove APIs—service constructor and destructor. APIs or services are materialized using micro services which furnish a variety of functionality such as auto scaling, logging behavior, security interfacing with AAA and profile for rights validation. Micro services can also have add or remove functionality labeled as constructor or destructor. A test-bed for the services or API validation is provided to the producers to test issues with real-time APIs or validate new offers before publication. This module employs the service deployment module for publish, package, deploy, maintenance, depreciate, and delete services or APIs.

(4) Transportation Event Analytics. In certain illustrative embodiments, this functional module uses state of the art statistical regression models and/or deep learning neural networks to apply to data gathered in the following categories: (i) waste transportation, i.e., how waste is conveyed to a set of processing facilities given the material type and nature; and (ii) events assessment, means of material processing and energy consumed, which are the various activities required for securing solid, liquid, or gaseous waste and conveying the waste to the appropriate processing sites based on the material type. There may be multiple processing steps involved to obtain the data for analytical processing. For example, plastics that are recyclable are collected, weighed, sorted by resin content, weighed, chopped, cleaned, melted etc. Data points for analytic processing are gathered. The statistical model uses the data points establishing relationships between the variables that are either random or non-random. The data regarding energy consumption throughout the processing steps is aggregated by material type and provided to the statistical models. The results of these statistical models are discoveries of unknown relations, enforcement of anticipated relations leading to further data-driven decisions and predictions. The sustainability data hub DaaS constantly validates and tunes existing statistical models as well as publishes new models as a service to be used by this module using the service constructor capability.

(5) Calculator: In certain illustrative embodiments, this functional module provides metrics and formula management. Various scenarios are presented for the choosing. Based upon the chosen scenario and selected conditions, the formula or combination of formulas selected for use is automated. The automation discerns what mathematically is logical and enforces or controls how combinations of formulas can be used or not. This is accomplished by storing templates for related equations that are logically sound by enforcing independent and dependent variable representation as describe by a particular formula as well as the mathematical unit's validation and enforcement when an independent variable in an equation is allowed to be placed as a dependent variable within another equation. The calculator automation process has a table of acceptable processing rules for combining various statistical formulas coupled with exception and warning messages. Scenarios can offer data sets that users can select and apply or manually enter. Selected data sets are obtained by using the data management module. When equations are defined, they will use the service calculator's test-and-run module to validate the equation runs as expected and without error. The analytics module provisions the calculator with proven statistical models with application instructions and dependencies. With regard to set targets, run 'what-if scenarios' and energy consumed, this module uses the service calculator's offers to investigate 'what-if' scenarios applying various data sets. Data sets are obtained by using the avoided emissions data management module. The calculator can be used to ascertain or model various GHG emissions targets using data sets obtained by using the data management module which provides mathematical variables based upon the breakdown of the material types and treatment methods so customers can forecast targets for waste diverted by material types using parameters such as pickup and delivery events, aggregated waste, tonnage, data, time-domains or ranges, and treatment methods.

(6) Analytics. In certain illustrative embodiments, this submodule serves the service calculator as well as the transportation event analytics module. Various derived statistical models for the sustainability data hub (artificial intelligence or "AI" and machine learning or "ML") are stored here for use. The service constructor leverages this module to offer various proven statistical models. The data scientist for the sustainability data hub supports this module by tuning existing models, deprecating, suspending, adding, delete, publish, or testing. Various statistical model types can be applied, such as supervised or re-enforcement. This module may not be offered to end-users; however, service providers may have access.

(7) Subscriptions. In certain illustrative embodiments, this module allows users to subscribe to various services. The end-user can navigate to this module using the sustainability data hub portal and select the service(s) they want to subscribe to. Services can include DaaS (Data as a Service), which is a product that supplies sustainability data and/or metrics on demand based on a concept of sharing, selling, or trading information that has been sourced. The DaaS can receive/get customer or end-user raw data and process into the sustainability data hub activity or process it through the AaaS and send it back the sustainability data hub for processing or back to the end-user. The DaaS is facilitated by data management where all the sustainability data hub APIs or data services are exposed to registered end-users, managed, monitored, and apply data protection plus proactive security run-time policies. RaaS (Reporting as a Service) offers cloud based standard reports and dashboards that can either run in real-time or be exported as a file to subscribers. These reports can either be user created or pre-defined by service providers and are facilitated by the display and reporting module. Another service is AaaS (Analytics as a Service), which provides the ability to run statistical algorithms against the sustainability data to provide deeper insight of the data by finding meaningful patterns using computation and statistical models and calculators. This module is supported by the analytics module library of algorithms and is also coupled with the editor in the service calculator model. However, this module can expose the formulas directly to end-users from the analytics library. End-users supply their source data into the sustainability data hub DaaS data management module and direct the data to the AaaS specifying which sequenced set of formulas are to process the data. End-users can pipe-line the algorithm output to other AaaS algorithms, and then send the final processed data back to the DaaS for processing or direct it back to the end user's platform via the DaaS/Data Management Module.

In certain illustrative embodiments, this module also allows users to transform invoice data to service oriented events, e.g., discarded material pickup. The sustainability data hub processes numerous forms of raw data from multiple industrial and regulatory agency sources, and this functionality is facilitated by the DaaS/Data Management Module. The sustainability data hub's primary objective for processing raw data is to transform it into a detailed service activity event, where each event operates on or processes the material in some fashion based on material type, and the representation is oriented with respect to time. This strategy is to ensure the capture of all sequences of waste collection and processing end-to-end by events. There are occasions when $3^{rd}$ party entities have their raw data source represented as invoices. Depending on the homogenized frequency of service within the invoice billing cycle, materials and volume or tonnage, the invoice detail (service, material, location, time, tonnage) is split into individual service events within a time series in the data management module. The service events are then submitted to the DaaS/data management module for the sustainability data hub processing.

In certain illustrative embodiments, this module also allows users to provide package and bundle services. Subscribers, producers and consumers alike, can bundle and package services chaining the processing of data into and out of each service in a desirable sequence. Crawler as a service proactively find potential partners, subscribers, and data service providers and provides a list along with a defined ontology of the found objects. A crawler has many ways in which data can be absorbed such as searching though either pre-defined data sets or scraping web sites looking for patterns or strings. Depending on the end-user's profile this service performs the following: (i) find and register subscribers; (ii) offer free limited-service capability immediately to subscribers and providers alike; and (iii) conduct security assessments on the discovered provider or subscriber. End-users specify the search criteria which is provided to the users as a menu of options. For example, users specify that they are seeking service providers for ESG reporting or subscribers that are medium to small business operations. End users can specify geographic domains they desire in the search criteria as well as the search frequency (e.g., weekly or monthly) and termination condition. Once the crawler completes the search, a report is presented to the end-user specifying the success rate for completing the search criteria and offering the end-user options to attempt to register the target, conduct security assessment and validation using state of the art s/w penetration tests, and then offer limited service capability as specified by the end-user invoking the crawler service. The Register service is used to on and off-board users and profile them according to user type, such as producer, or consumer, or both. Profiles are created that capture corporate information, e.g., start and end dates of registration, enterprise organizational hierarchical structure and relevant contact information, and the sustainability data hub provides access rights to the sustainability data hub service. This module has reporting capability where the profiles can be delivered to their registered owners.

(8) Crawlers. In certain illustrative embodiments, this module is an automated process implemented within a s/w machine that facilitates the subscription service description and interacts directly with end-users. Among the functions of this module are: (i) proactively secure relevant information as specified when subscribing to the service; (ii) proactively identify potential producers and consumers; (iii) find and register users both producers and consumers; (iv) offer free limited-service capability immediately; and (v) conduct security assessment. Crawlers can find potential partners, subscribers, and data service providers to: (i) find and register; (ii) offer free limited-service capability immediately; (iii) conduct security assessments; and (iv) connect raw data source using the data management module. Crawlers can search through the world-wide-web looking for data associated with sustainability objectives and reporting, and provide suitable data around sustainability and any other function within the sustainability scope. Since the Crawler is a service managed by end-user criteria, once the end-users accept the Crawler results and registration of new resources and security validations have completed, the crawler uses the DaaS/data management modules to materialize the data feed when new sources of data are required. The data management module is responsible for the conducting, data source library and editing functions. This module indirectly employs the data homogenization module.

(9) Data Homogenization. In certain illustrative embodiments, this module is not exposed to the end users. Instead, it is utilized by the DaaS/Data Management modules to standardize raw data input into the sustainability data hub homogeneous data structures that are service oriented. The sustainability data hub data formats are detailed herein. Transformation is realized using data mapping concepts from various 'raw' formats to standard sustainability data hub representations. The module uses machine learning statistical regression techniques to match raw data elements to target standard elements probabilistically. If the machine cannot resolve an input match and transform it to a standard target, an exception is identified as an alert for the sustainability data hub operations team to resolve using standard extract transform and load techniques. This module is used by the Data Management and Crawler Modules.

(10) Data Management. In certain illustrative embodiments, this module relates to the Service Calculator, Data Homogenization, Subscriptions, Crawlers, Graphic Constructor, and Display & Reporting. The functionality of this module is to provide an end-to-end data service management to the sustainability data hub. It essentially is responsible for all aspects of the sustainability data hub data management operationally and adherence to industry and regulatory mandates. This functionality also exposes secure-data API's and Services to registered users on behalf of the sustainability data hub. The core capabilities are as follows: (i) Data Editor: the sustainability data hub operators use the editor to conduct the following functions: (ii) Data Clustering; logical aggregation of data sets; programmatic and operational discipline; (iii) Data Classification; Classification is an operational discipline that groups data by level of sensitivity (H/M/L) and manages/protects it accordingly ensuring regulatory mandates are met, e.g., GDPR, DSS, PCI; (iv) Data Normalizer; Data transformation operations, aggregation, preprocessing remodeling, scaling; (v) Data Integrity & Validation; (vi) Data Library: Index mechanism of various classes of data addressing customers/consumers, data producers, regional and country the sustainability data hub HUB metric standards, etc.; (vii) Create data ontological structures/continuous optimization of the morphology of the data structures materialize using the sustainability data hub operations technical team employing typical information technology policies and practices; (viii) Raw-data-Source Plug-Ins/Connectors/Joining; EAP, ESG, APIs are exposed to registered entities. There are two types of APIs, standard-fixed interfaces and Adaptors or plug-ins, The later interfaces to external resources to get or put data to or from the sustainability data hub platform. The former are APIs that the sustainability data hub HUB partners use to consume the sustainability data hub data and are fixed. The adaptors are standard protocol canonical data models that transform various acceptable raw-data formats into standard sustainability data hub pre-presentation for processing. Adaptors have many types or classes of data translation distinction, and example would be consuming a $3^{rd}$ party entity's waste or material data set and transforming it to the sustainability data hub standard representation such as service oriented formats. the sustainability data hub operations teams will work with external entities to map their unique data formats to these adaptors. Most of the adaptors use machine learning statistical processing to determine (using probability) which raw-data element and data-type maps to the particular adaptor's canonical data model; (ix) Source Normalizer; automatically predicates that preprocess, optimize, scale up or down the source data to normalize it into standard sustainability data hub contracts; and (x) Data persistence, maintenance, security.

(11) Display & Reporting. In certain illustrative embodiments, this module is supported by the Graphic Constructor and Service Deployment and used by the Subscription module. The Subscription module invokes this module as RaaS (reporting as a service) when end-users want to subscribe or remove a subscription; in those cases, the sustainability data hub using zero-trust technologies allows access to the particular reports subscribed. Reports can be in dashboard, downloaded flat file, PDF form or other state-of-the-art technology. This module enables subscribers to use RaaS capability to select and receive alerts in real-time. Subscribers can select alerts from a menu of various types. For example, producers may want alerts when new data refreshes are made to subsets of the sustainability data hub data sets or when there are issues with the subscribed APIs, Adaptors etc. This module also offers users the capability of pushing or distributing reports periodically based on alerts and/or set frequencies. Reports can be pushed or sent from the sustainability data hub to a list of recipients with a specified interface. End users are able to set report types that may be sent to operations, auditors, and management teams. The module is a report-engine that runs continuously and generates, collects and stores reports. The module also alters and renders specified reports as dashboards. The module 'reads' report-specific data from the sustainability data hub using the report framework or template built and tested within the Graphic Constructor. This engine uses the Data Management APIs to secure the data when rendering reports. This module operates agnostically to multiple reporting tools offered by the industry by encapsulating them within the sustainability data hub execution framework. Technical concepts such as 'microservices' are employed to encapsulate various and multiple concurrent tools. This engine retains all the necessary operating report parameters which are defined in the Graphic Constructor and uses these as interface variables to the various reporting $3^{rd}$ party tools. This module also offers the sustainability data hub specific report engine should the producers decide to use it and it is managed the same way as the $3^{rd}$ party industry offers.

(12) Graphic Constructor. In certain illustrative embodiments, this module is a tool set used by the sustainability data hub operations team or customers that are producers. The purpose of this tool is to design, create, test and deploy reports and/or dash boards using 2D and 3D report generators and incorporating various 2D and 3D graphic report representation. Reports built using this tool are deployed to the Display and Reporting module using the Service Deployment module. Users can build Reports as a Service (RaaS) applying typical service characteristics. This module allows developers to select which reporting engine they want to use to render reports. The choices can be the organic report, the sustainability data hub reporting engine or external cloud or hosted tools.

(13) Service Deployment. In certain illustrative embodiments, this module is a service deployment engine used by the sustainability data hub to install tested services and reports into the various modules of the sustainability data hub as operational objects. This module employs typical state-of-the-art technology.

Figure 11:
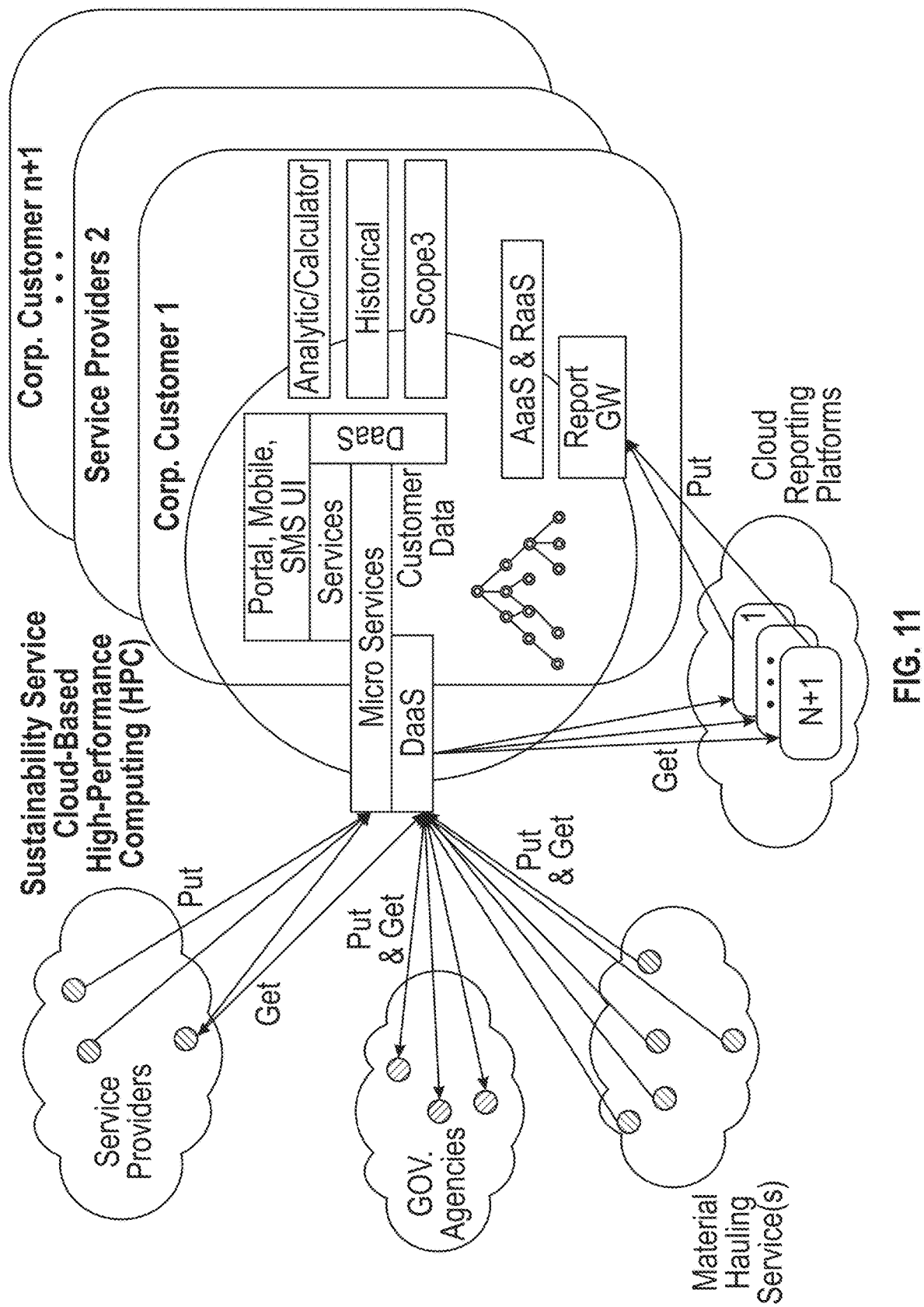
FIG. 11 is an example of a high performance computing ("HPC") sustainability as a service environment that is a self scaling environment through the use of containers that are abstracted away from a subscriber, in accordance with an illustrative embodiment of the presently disclosed subject matter.

As shown in FIG. 11, in certain illustrative embodiments, the presently disclosed system and method can provide a high performance computing ("HPC") environment that is a self-scaling environment through the use of containers that are abstracted away from the subscriber, whether a customer or service provider, to ensure high performance and responsiveness. The scaling functionality includes DaaS, RaaS and Analytics as a Service.

In certain illustrative embodiments, the presently disclosed system and method can facilitate "sustainability as a service" offerings to users in one or more of the following ways.

(1.) Sustainability as a Service. This feature is concerned with other components and how these components are transported, exchanged, offered, and integrated into value-chains for various industries. The presently disclosed subject matter offers a global information center or data 'hub' for the entire waste spectrum and provides monitoring of the rate of change toward a clean climate (industry, commercial, residential, agency).

In certain illustrative embodiments, the presently disclosed subject matter also provides centralized and consolidated data continuously using data sources distributed globally as input where it is processed into standardized units or metrics using local regulatory definitions then offered as a service to global companies and governments entities.

For example, North American regional waste $3^{rd}$ party haulers or other entities that collect waste data, can interoperate with the sustainability service and provide detailed service or other records of waste recovered for all of their clients materially categorized. These companies can use state-of-the-art secure network interfaces to exchange data to the presently disclosed system. The sustainability service can transform this data into a set of canonical information standard data models based on regional definitions of waste metrics. The sustainability service platform maintains multiple information models for each regional and/or country regulatory standards. Information can be organized by region. Large manufactures or retail corporations can procure the sustainability service and subscribe to the various information model standards, and then receive near-real-time data updates as preferred and filtered by their company. These companies can connect to the sustainability service using various forms of state-of-the-art secure interfaces. The interfaces can provide both raw data as well as standardized and/or custom reports. Raw data received can be submitted to internal reporting tools or purchased external/internal reporting services as desired. If the interface is for reporting, these corporate customers would leverage the sustainability service's network interface to receive standard and/or custom specific reports.

In certain illustrative embodiments, source data is collected as various documentation sets or types as described above. The data collection point can be at the landing zone where raw data or documents are loaded and aggregated, and then processed to remove redundant representations, cleansed to resolve element multiplicity eliminating redundant representations into singular form, normalized by scaling up or down the data range and feature set, e.g., z-Score, and reorganized to remove any ambiguous data representation to a standard format focused on sustainability metrics. The transformation process can include using statistical means as characterized in the current and evolving art of machine-learning algorithms where data is classified and transformed statistically into standard metric representation. The standard representation can be a canonical information model specifically representing a set of sustainability metrics.

For example, in certain illustrative embodiments, the application of a set of semi-normalized data sets the layer closest to the landing zone to be loosely normalized, and the data can traverse a plurality of master-tables via domains where each matrix layer or master-table becomes more normalized until it reaches the canonical model, which could be represented by a set of fact-tables and dimensions where these are responsible for summating the metrics. A representative example is shown in U.S. Pat. No. 8,311,975 to Google, Inc., the contents of which are incorporated by reference herein in their entirety, but are modified and/or enhanced as described herein to apply specifically to sustainability metrics.

Other modern or conventional means of extracting, transforming, and loading data to a canonical model can be used to facilitate the standardization. Throughout the data propagation and refinement process, the sustainability service tracks the document processing and refinement at each layer so that an end-to-end audit trail can be reviewed for quality purposes as necessary.

In certain illustrative embodiments, the standard sustainability data set or data feed is a canonical model that represents a standard global view of data surrounding waste producers and waste disposal services. The canonical model uses a standardized vocabulary along with a defined taxonomy and semantic definition to build a standardized format which is a superset of all data collected by the data hub. The canonical model also defines the data as it exists as a service provided across all producers and handlers of waste, and not for any specific technology or industry sector. Data populated into the model is a subset of the canonical model where all entries and attributes may not be represented. Attributes not defined by the canonical model are handled in a separate exception process.

In certain illustrative embodiments, the data populated is only relevant to those data elements needed for reporting and analytics of these services. This data does not attempt to directly manage or control the actual activities of waste handling. Waste producers and waste handlers are the sources of data populated in the standardized data feeds. Additional data services provided by the data hub will also have associated canonical model(s) pertaining to the service such as ingestion of invoices or work orders for conversion to a standardized data feed for waste disposal service provided.

In certain illustrative embodiments, the standardized data feed can ensure the accurate reporting of sustainability metrics. Certain master data defining the services and measures are required. The data hub uses standardized representation of data defined by standardized organizations spanning across organizations and industry. These organizations are private or public organizations that are recognized standard bodies to supply consistent definitions and codes across national and international industry. Examples of such organizations include International Organization for Standardization (ISO), Environment Protection Agency (EPA) and Greenhouse Gas Protocol (GHGP). Standards used by companies in defining greenhouse emissions metrics may be specific to the country in which the service is provided. In certain illustrative embodiments, the data hub only accepts these standard body definitions of codes representing materials, transportation, fuel, treatment types and treatment methodologies.

In certain illustrative embodiments, the standard sustainability data set includes the set of STD interfaces to the data set for PUT and GET-1. Service providers put data showing service events for customers at specific service locations hauling a volume or tonnage amount of a specific material. Service providers get data associated with aggregated client sustainability performance and logs of data source issues. Government agencies provide standard sustainability information regarding material emissions and waste treatment method emissions as well as other regulatory information around sustainability.

(2.) Subscribe and Push technology APIs Data as a Service (DaaS)—entities focused on ESG reporting, for example, global software manufacturers that have interest in this area producing platforms for the ESG market that will interface to SDH to consume standard data metrics based on their customers data. According to certain illustrative embodiments, the sustainability data hub offers information-services, commonly characterized as Data as a Service (DaaS), that are either produced or consumed by customers of the sustainability data hub. Producers of services include the sustainability data hub operations teams as well as partners and service providers. Partners are external entities that use the SHD data either wholly or augmented by their external data sources and processed to offer the public value-added services and usually have s/w systems that consume and/or merge the sustainability data hub data into their s/w platforms for processing; consumption is enabled by access to the DaaS. Service providers are those entities that monitor/measure, process, recycle, collect and/or transport waste. All of the sustainability data hub services are offered to customers, partners, and service providers as application programming interfaces (APIs) exposed from the sustainability data hub—DaaS/Data Management Module. As an example, service providers such as a company like a large global s/w product manufacturer can subscribe to the sustainability data hub platform to offer or publish a set of APIs that provides subscribers processed data from $3^{rd}$ party environmental conscience companies. For example, a service provider could consume U.S. SIF Foundation data reporting on investments of companies with ESG operations strategies, such as a public pension fund's profile. Subscribers would consume these data to support their investment choices.

(3.) Distributed Portal Services, including: (i) logically and physically distributed; and (ii) functionally distributed. This allows the Portal to scale automatically ensuring performance.

(4.) 3rd parties can join the service and data as a service with the presently disclosed system and method for reporting and analytics presenting how their service is affecting a client's sustainability.

(5.) Technology Agnostic to report mechanisms. All software and service used can be designed and used in a manner of being replaceable with minimal interruption to the overall program. Avoid proprietary solution where possible avoiding vendor dependence.

(6.) Automated service threads employing link-relationships to organizations with sustainability services.

(7.) Sustainability as a Service Functional Components—Functional Capability.

(7.a) Transportation from source & assessment: identifies what, where, when & how and for whom was picked up contents of the container, location based (7.b) Means of conveyance to destination: Records & assess all steps processed and how much fuel used to move material by: (i) Distance; (ii) Vehicle types by fuel consumed, and type of fuel used, and rates of each based on distances; and (iii) Process steps.

(7.c) Transportation to destination and assessment at the destination, which identifies how the material is processed.

(7.d) Materials transported and type of material assessment; identifies density factor(s) to use.

(7.e) Data Source Library and Editor—Crawler to find new data sources; manage library of data sources consume/producer.

(7.f) Metrics & Formula Editor—(Distributed) profiles that are consumed by the calculator, provide a library of existing data sources, and if desired source does not exist, auto connect to Data Source Library and Editor.

(7.g) Graphics Constructor; Create and Define types (2D and 3D and 4D)(with respect to time forecasting mechanism).

(7.h) Service Calculator: (i) GHG emissions; (ii) consumes Graphic Constructor & Metric & Formula Editor products and executes the formulas to drive 2D, 3D, and 4D graph; and (iii) ascertain Investment tradeoffs scope to scope.

(7.i) Connectors to external and internal sources, e.g., Data source library and Editor.

(7.j) Data Normalizer as a Service.

Standardizing and Reporting of Waste and/or Recycling Sustainability Data

In certain illustrative embodiments, a system and method are provided for standardizing and reporting of waste and/or recycling sustainability data from a plurality of non-standardized sources.

Waste and recycling service providers collect large amounts of waste and recycling data from customers. There can often be many different categories of data, as well as different sources for this data. For example, there can be millions of tons of disposal lines, which can include cardboard, plastic, and all the other different types of materials that a waste and recycling service providers can manage, or the waste and recycling service providers can use third-party companies to manage on the customers' behalf.

Each customer or other data provider can gather and store waste and recycling data in their own local records. This data is often stored locally on a computer in a non-standardized format selected by whichever hardware or software platform is in use in the customer's local office. For example, the information can potentially be gathered and stored in a dozen or more different platforms and systems with different and/or unrelated formats, such as Excel, pdfs, emails, or even manual hard copies. It is difficult for customers to share updated information with the waste and recycling service providers using current systems.

Moreover, the service provider and customer are physically separate from each other which makes sharing of the data additionally challenging. Currently, customers must continually monitor their own internal records for updated waste and recycling information to share with the waste and recycling services provider, which is often times incomplete since data is not timely or readily shared or cannot be consolidated due to format inconsistencies. Answers to customer questions such as "how much waste was generated?", "how much of that waste was recycled versus landfill?", and "what is the true environmental and sustainability impact of what we are doing?", can be incomplete or inaccurate due to data collection or sharing inefficiencies. Also, analysis of customer sustainability-type questions such as "if I have a ton of organic food waste, am I better off putting it into a landfill if that landfill can capture the gas and create fuel, or am I better off sending it somewhere where it's going to be composted and produce greenhouse gases?", can also be difficult to answer.

In addition, timely and comprehensive waste performance data is often lacking as to a company's total waste footprint aggregated amongst different waste haulers and waste treatment/disposal operators. Most organizations use multiple 3rd party providers for the management of their waste streams. Each waste management service provider has their own systems and data management methods to record how waste streams are collected, routed, reused, diverted to different treatment facilities or disposed. To collect and assemble the data from the various waste management operators, companies must place phone calls, send email/faxes and even then, their only option is often times to type the data manually into spreadsheets from invoices and manifests to get a comprehensive picture of the organization's waste profile. As a result, data is in incompatible formats, using different codes to denote waste services, locations, and treatment methods which makes it impossible to aggregate into a comprehensive data set to be used to determine specific sustainability metrics.

There can also be a lack of data granularity to establish the emissions associated with specific diversion scenarios, for example, evaluation of the option of hauling a specific waste material to different landfills/MRFs based on the specific transportation options selected and their emissions impact as well as based on the different treatment options for the respective waste stream, for example landfilling, recycling or incineration.

There can also be a lack of accurate data on GHG emissions footprints associated with different types of waste treatment and disposal methods, for example, a landfill that flares its gas versus a landfill that uses landfill gas to produce electricity or renewable natural gas (RNG) fuel.

Many companies are facing increasing pressure to set sustainability targets related to GHG emissions based on scientific data and track performance against those targets as well as report on those targets.

To be able to compare and therefore improve waste performance, companies need more accurate benchmarking data for their own organizations as well as to compare to 3rd party peers. It is difficult for companies to compare and establish targets across their own organizations as they oftentimes don't have accurate and consistent data per location as to the volume of waste generated, how much of it is diverted, how much goes to landfill and what are the associated GHG emissions. Similarly, companies would like to have this data to establish benchmarks not only for entities within their own organization but to compare across different types of industries. Companies encounter multiple roadblocks and deficiencies with currently available data, systems and processes to be able to achieve the above described goals.

To address these and other issues, the presently disclosed system and method can provide a network-based sustainability data hub service that collects, converts and consolidates waste and recycling information from various customers and other internal and external sources. In certain illustrative embodiments, the system and method can convert non-standardized information from various sources into a standardized format, store the information in a network-based storage utility, and use the standardized information to generate customized reports for, or on behalf of, the customer, as well as notify the customer that the information has been updated to the standardized format. In certain illustrative embodiments, the system and method can also be used to report waste and recycling volume and logistical information as well as information on impact to the environment with comparative analysis and predictions, to help the customer better manage its businesses and their operations.

In certain illustrative embodiments, a customer or other data provider can utilize a portal having a graphical user interface (GUI) that is operationally connected to a distributed content platform, which is hardware or a combination of both hardware and software. The customer can input the waste or recycling data in any non-standardized format used by the user's local device (e.g., a personal computer, wireless handheld device, or entire data platforms), such as manually into spreadsheets from invoices and manifests. Whenever the customer information is updated, it will be delivered to the content server and converted from the non-standardized format into the standardized format and then stored in the collection of waste and recycling records on one or more of the network-based storage devices. After the updated and standardized information has been stored in the collection, the content server, which is connected to the network-based storage devices, generates a message to the customer regarding the updated information. This message is transmitted in the standardized format over the computer network to the customer and to any other recipients that the customer had designated and/or that have access to the customer's information (e.g., EPA, other users, etc.) so that all recipients can quickly be notified of the updates in the standardized format.

In certain illustrative embodiments, a method is provided for standardizing and reporting of waste and/or recycling sustainability data. The method can be used to calculate and normalize a variety of different types of sustainability data points from different sources to determine a sustainability footprint associated with a user in a particular line of business and its associated business needs. The method can include one or more of the steps provided below:

(i) Gathering a first set of data comprising the customer's internal company data (for example, (1) Org Hierarchy; (2) Service Locations for discarded material consumption; (3) Intensity-factors; (4) Target scoping metrics for forecasting; (5) Assigning to each customer data set a client-Id; and (6) Augmenting all the relevant state-of-the art-security measures to the total aggregate, and using state-of-the-art technology for conveying information from the customer to the sustainability data hub. An example is that exposed API or DaaS can be used by the customers to transfer the required data).

(ii) Gathering a second set of data comprising external 3rd party data. The 3rd party could be the customer or an external entity, rather than the customer's service provider. The data is service oriented, meaning how discarded material is collected, transported, and processed. The interest is in collection of the related data that describes how, when and where discarded material is processed. State-of-the-art technology can be used for conveying information from the customer to the sustainability data hub. An example is the sustainability data hub's exposed API or DaaS can be used by the customers to transfer the required data.

(iii) Converting the gathered data comprising the first set of data and the second set of data from a non-standardized format to a standardized set of classified objects. Raw data is provided as above that is submitted to a statistical-system-engine that pre-processes, cleans, sorts and categorizes the data into multiple structure for example, analyze the ontology of each data element using statistical correlation to determine its relation to other data elements from the raw-source to arrive at a set of classified objects. In parallel to the above procedure the sustainability data hub ensures that enough data is available to meet the sustainability data hub's minimum standard requirements to meet a critical-mass of data that can effectively support logical and comprehensive sustainability reporting. Additionally, specific data processing algorithms execute for the adjustment of data-row-grain thereby formulating conversions into standardized format. This can be accomplished using conventional data processing methodologies. The statistical-system-engine data conversion process is achieved through the application of Reinforced-Learning. The sustainability data hub executes a set of inference engines, including one that consumes the 3rd party service provider's raw-data, synthesizes it and validates the object(s) by sending the object(s) to a second inference engine that returns a reward back to the synthesizing process The results are scalar values where higher numbers represent greater success. The goal of this process is to arrive at an optimal representation of the data that is input to the sustainability data hub. Based on the quality of the reward the consumer inference engine determines the optimal object representation that conforms to the sustainability data hub defined standards. The second inference engine maintains a set of rewards coupled with string matching or transformation algorithms and rule sets ultimately enforcing the sustainability data hub data rules of conformance. These inference engines are part of the data homogenization module as shown in FIG. 10.

(iv) Normalizing the data classes or objects for the loading of data into a standardized sustainability data hub model with pre-defined grains and classifications allowing for a consistent semantic layer.

(v) Determining a sustainability footprint based on the sustainability data hub model, wherein the determination is comprised of the sustainability formulas and aggregations.

In certain illustrative embodiments, the sustainability data hub generates sustainability waste metrics that incorporate the standardized waste and recycling data of the customer, government regulator specifications, and 3rd party discarded waste service provider's data. The standardizations are comprised of one or more of, but not limited to: addresses to match U.S. Postal Service standards; services and locations as between the service provider and the customer to enable comprehensive reporting across customer data to material disposal data; standardization of types of lines of business for comparison; standardization of vehicle fuel types; standardization of pickup vehicle types; standardization of container types; standardization of units of measure to international standard (ISO) codes; standardization of material codes/names, treatment type codes/names, treatment facility types and region code/names to map to external protocols such as U.S. EPA WARM, U.S. EPA AP-42, and European Environmental Agency; standardization of intensity numerators for benchmarking based on square footage, residents, or units produced; and standardization of dates to a common format.

Illustrative embodiments of user portals are shown in FIG. 12A and FIG. 12B herein. The user portal is a landing page for frontline customers and users.

In certain illustrative embodiments, a method of aggregating, standardizing, modeling, and reporting sustainability data related to waste and recycling in a sustainability as a service environment is provided. Waste and recycling data of a first party can be stored in a standardized format in at least one network-based non-transitory storage device having a collection of waste and recycling data stored thereon. Remote access can be provided to a second party over a network so the second party can update the collection of waste and recycling data in real time with waste and recycling data of the second party through an application programming or graphical user interface, wherein the second party provides the updated data in a non-standardized format based on the hardware and/or software platform used by the second party. The non-standardized updated information can be converted, by a content server, from the second party into the standardized format.

In certain illustrative embodiments, a method of aggregating, standardizing, modeling, and reporting sustainability data related to waste and recycling in a sustainability as a service environment is provided. Waste and recycling data of a first party can be stored in a standardized format in at least one network-based non-transitory storage device having a collection of waste and recycling data stored thereon. Remote access can be provided to a second party over a network so the second party can update the collection of waste and recycling data in real time with waste and recycling data of the second party through an application programming or graphical user interface, wherein the second party provides the updated data in a non-standardized format based on the hardware and/or software platform used by the second party. The non-standardized updated information can be converting, by a content server, from the second party into the standardized format, wherein the converting of the non-standardized updated information from the second party into the standardized format comprises a plurality of, or alternatively each of: standardizing of addresses to match U.S. Postal Service standards for matching address records; standardizing of services and locations between the service provider and customer to allow reporting across customer data to material disposal data; normalization of date period of service events with frequency of services across those date periods grain for proper aggregating and reporting of metrics; standardization of types of business for comparison; standardization of vehicle fuel types; standardization of collection vehicle types; standardization of container types; standardization of units of measure to international standard (ISO) codes; standardization of material codes/names, treatment type codes/names, treatment facility types and region code/names to map to external protocols including but not limited to U.S. EPA WARM, U.S. EPA AP42, U.S. EPA GHG Emission Hub and European Environmental Agency; standardization of intensity factors for benchmarking based on factors including but not limited to square footage, residents, or units produced; and standardization of dates to a common format. The standardized waste and recycling data from the second party can be stored in the collection of waste and recycling data. Sustainability decision models and waste metrics services can be generated that incorporate the standardized waste and recycling data of the first party and the standardized waste and recycling data of the second party. This information can be made available in a high performing sustainability as a service environment to a plurality of third parties over the computer network in real time. In certain aspects, one or more authorized third parties can have immediate access to the standardized waste and recycling data and the sustainability decision models and metrics derived from that data in various subscription configurations to perform modeling and reporting. The subscription configurations can include, without limitation: optimizing of operational waste and recycling sustainability targets by hierarchy level and for specific NAICS classifications; applying analytics models for waste and recycling weight estimation; analyzing carbon trade off scenarios based on material and treatment method; using a graphical interface to visualize sustainability metrics related to waste and recycling; and generating reporting outputs for compliance with certification frameworks and standards comprising GRI, SASB, EU Corporate Sustainability Directive and LEED certification.

In certain illustrative embodiments, a method of standardizing and reporting sustainability data related to waste and recycling is provided. Waste and recycling data of a first party can be stored in a standardized format in at least one network-based non-transitory storage device having a collection of waste and recycling data stored thereon. Remote access can be provided to a second party over a network so the second party can update the collection of waste and recycling data in real time with waste and recycling data of the second party through a graphical user interface, wherein the second party provides the updated data in a non-standardized format based on the hardware and/or software platform used by the second party. The non-standardized updated information can be converted, by a content server, from the second party into the standardized format. The standardized waste and recycling data from the second party can be stored in the collection of waste and recycling data. A message can be generated by the content server when the standardized waste and recycling data from the second party has been stored. Sustainability waste metrics can be generated that incorporate the standardized waste and recycling data of the first party and the standardized waste and recycling data of the second party. The message can be transmitted to the second party over the computer network in real time, so that the second party has immediate access to the sustainability waste metrics and to the standardized waste and recycling data of the second party. In certain aspects, the converting of the non-standardized updated information from the second party into the standardized format comprises at least one of: standardizing of addresses to match U.S. Postal Service standards for matching address records; standardizing of services and locations between the service provider and customer to allow reporting across customer data to material disposal data; normalization of date period of service events with frequency of services across those date periods grain for proper aggregating and reporting of metrics; standardization of types of business for comparison; standardization of vehicle fuel types; standardization of pickup vehicle types; standardization of container types; standardization of units of measure to international standard (ISO) codes; standardization of material codes/names, treatment type codes/names, treatment facility types and region code/names to map to external protocols such as comprising U.S. EPA WARM, U.S. EPA AP42, and European Environmental Agency; standardization of intensity numerators for benchmarking based on square footage, residents, or units produced; and standardization of dates to a common format Practical Applications and Use Cases The presently disclosed subject matter has a variety of practical applications, as well as provides solutions to a number of technological and business problems of the prior art.

For example, the customer facing applications may be present in the form of downloadable applications installable and executable on user devices, e.g., "electronic viewing portals" such as computers, smartphones, or tablets. Additionally (or alternatively), the customer applications may be available as one or more web applications, accessible via a client device having an internet browser.

Representative examples of use cases for the presently disclosed system and method are as follows:

Use Case 1: Large Book Store Chain

Overall goals: This customer launched a sustainability initiative and dedicated itself to becoming a net-zero emissions company within a set period of time. The customer aims to reduce waste and GHG emissions across all of its store locations, with the specific goal of diverting 99 percent of waste from landfills to recyclable and compostable streams.

Along the way, they have encountered the following pain points while working toward goals: lack of waste visualization to share with individual stores and communicate goals; inability to view the type of material diverted; and inability to view waste GHG emissions at a store level, which inhibits them from identifying "problem" store locations and remediating them; contamination data arrives too late to respond; lack of insight into GHG emissions from waste; and employees in the organization do not understand the effect that treatment methods and material types have on GHG emissions.

The presently disclosed system and method can address these pain points by: providing a portal and/or dashboard to provide visualizations of their critical waste data, enabling them to drill down into individual stores and share insights with store managers; allowing customers to view waste diverted and the various material types it is composed of to help them identify opportunities to meet their goal of increasing diversion; viewing GHG emissions data at a facility level and using the information to help guide individual locations towards more GHG emissions-friendly treatment methods providing the customer with much more up-to-date contamination data, allowing them to identify the source of the problem and fix it more quickly; providing an easy view into GHG emissions data and a breakdown of the material types and treatment methods that caused it; and providing users with the ability to view a GHG emissions chart which breaks down the GHG emission factors associated with different material types and treatment methods.

The presently disclosed system enables the customer to effectively audit every store every month or quarter by providing the required waste performance reports. In addition, the data contributes to generating carbon footprint studies that contribute to better decisions in how to reduce GHG emissions associated with waste, for example by providing specific locations that can divert specific material types to recycling along with the respective volume/quantity/cost information.

Use Case 2: A Global Provider of Risk Management Products and Services

Overall goals: This customer has committed to incorporate relevant ESG factors and trends into the analysis of the long-term performance outlook and value of investments. The company has made reducing waste and GHG emissions a strategic priority.

Along the way, they have encountered the following pain points while working toward goals: difficulty benchmarking against competitors; difficulty monitoring goal progress; lack of insight into GHG emissions from waste; disclosing landfill diversion in accordance with the relevant ESG standards; and wanting to avoid greenwashing by only reporting accurate data.

The presently disclosed system and method can address these pain points by: hierarchy levels that enable comparisons of waste profiles for competitive benchmarking; a dashboard that provides visualizations of critical waste data and indicates how an organization is progressing towards its goals; providing a view into GHG emissions and a breakdown of the material types and treatment methods that caused it; users can export their waste data into a CSV file, which is formatted using GRI and SASB standards.

The presently disclosed system enables the customer to benchmark against peers, publish GHG emissions reduction goals that are science-based, save time on data gathering and analysis by getting access to an automated dashboard with the waste and associated GHG emissions metrics they need for reporting.

Use Case 3: A Multinational Designer, Manufacturer, and Distributor of Construction Materials.

Overall goals: This customer has committed to being carbon neutral by 2050. The organization wants to offer customers increasingly sustainable solutions and has the specific goal of reducing its Scope 3 GHG emissions by 16% by 2030.

Along the way, they have encountered the following pain points while working toward goals: Inability to break out Scope 3 GHG emissions from waste; No insight into how much of their waste is being diverted; Waste data is not available in a timely manner; No insight into a waste container's material type and how it was treated or recycled; Difficulty establishing internal benchmarks.

The presently disclosed system and method would address these pain points by: providing a view into Scope 3 GHG emissions and a breakdown of the material types & treatment methods that caused it; allowing customers to view waste diverted and the various material types it is composed of to help them identify opportunities to meet their goal of increasing diversion; providing the customer with significantly more up-to-date waste data; providing data up to the container level; and allowing for easy comparison across all customer locations and hierarchy levels.

Use Case 4: a U.S. Based Multinational Cosmetic Company that Manufactures and Markets Makeup, Skincare, Fragrance and Hair Care Products.

Overall goals: This customer has made sustainability a key part of its corporate strategy for the future. In addition to using sustainable products and packaging, the company is committed to reducing its Scope 3 GHG emissions by 60% by 2030. The company is also committed to a zero-landfill goal.

Along the way, they have encountered the following pain points while working toward goals: Overly manual waste data collection process; Lack of insight into Scope 3 GHG emissions from waste; Data is only aggregated once a year, which inhibits insights from being found; lack of bandwidth as no one at individual facilities has time to consistently track and report waste data; Difficulty performing internal benchmarking and target-setting; Lack of clarity as to where waste actually ends up.

The presently disclosed system and method would address these pain points by: offering an automated way for customers to view their aggregated waste data; providing a view into Scope 3 GHG emissions and a breakdown of the material types & treatment methods that caused it; providing the customer with much more up-to-date waste data, allowing the customer to discover insights in time to take action on them; significantly the amount of time and effort needed to collect and aggregate waste data; making it easy for the customer to compare waste across the entire organization, set goals, and monitor progress towards them; and providing users with data related to the types of waste diverted and the specific treatment method it was sent to The presently disclosed system enables the customer to set global goals and individual waste sustainability targets. It enables customers to make better decisions about their waste and carbon footprint based on data and analytical decision support models. The commonality among all of the above described use cases allows different users to utilize the same technology in addressing the problems they present.

A representative example of a practical application for the presently disclosed system and method is as follows:

Hypothetical Store: ABC Foods ("ABC" or "ABC Foods") has provided a hierarchy to the sustainability data hub that is used for sustainability reporting. ABC chose 3 major paths under the top organizational level named "Enterprise." Each path represents different types of operations that ABC owns. These paths are Retail, Product Development and Offices. The warehouse is reported within the Retail path. Each path represents its own unique challenges in discarding material. Each path is 3 levels deep from Enterprise to Service Level which are the locations where the material is discarded. ABC Foods provided the reporting hierarchy shown in FIG. 13.

Based upon this hierarchy, ABC Foods has supplied the file shown in FIG. 14 in a CSV format for loading into the sustainability data hub. The sustainability data hub loads the customer Organization Hierarchy data into a staging area for validation. In the hierarchy, a parent to child relationship is established. A parent is 1 level higher than the lower level known as the child. A child can only have 1 parent. After validation, the customer is loaded into the sustainability data hub customer tables shown in FIG. 15. Currently the Level 4: Sub-function level and any other N/A level is being skipped.

Figure 24:
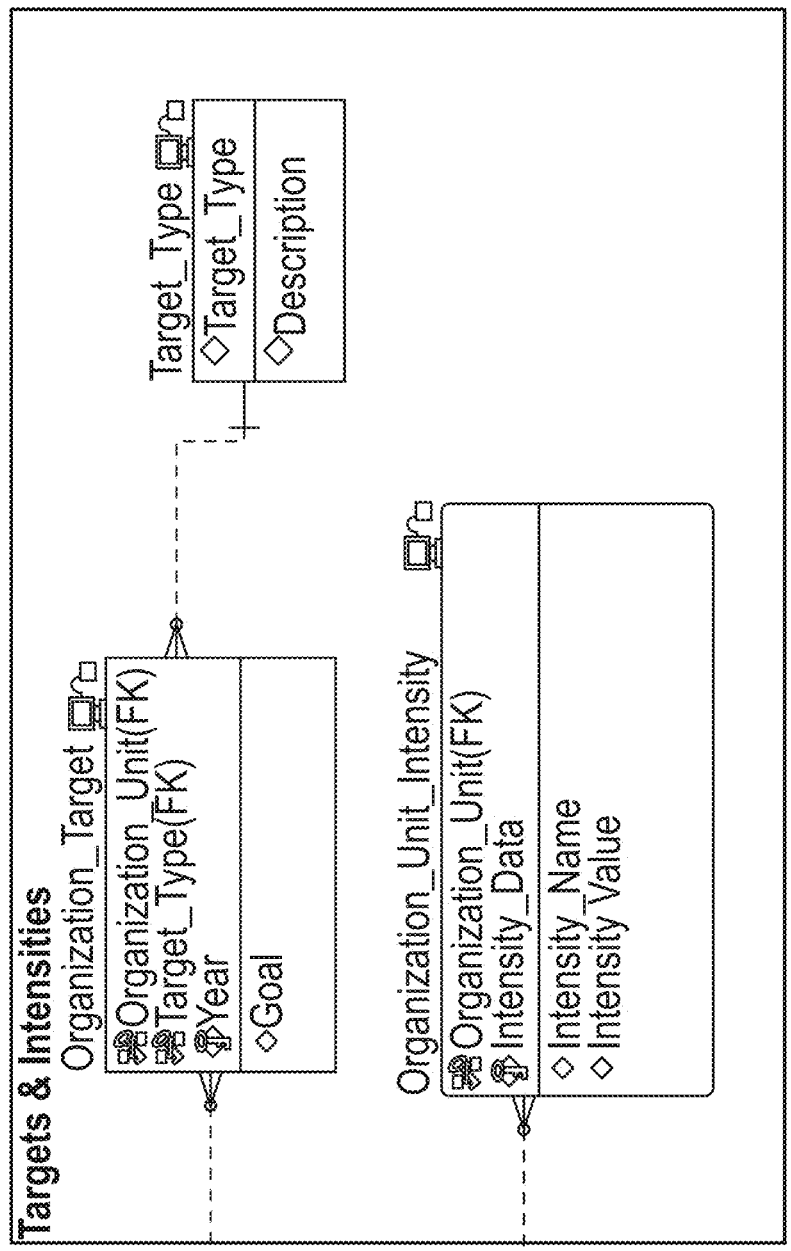
FIG. 24 is an example of an organization unit and a time frame for the sustainability data hub, in accordance with an illustrative embodiment of the presently disclosed subject matter.

Intensities are used to help comparisons across different organization levels. ABC Foods is only interested in comparing stores. ABC supplied this file in a CSV Format for load in sustainability data hub as shown in FIG. 16. The sustainability data hub loads intensity data into a staging area for validation. Intensities are defined by an Organization Unit and a time frame. See FIG. 24. An Organization Unit can have many intensities for any specific date within the date window and Organization Unit intensity can only have one value.

Hypothetical Services: ABC Foods has 7 different and distinct types of materials that are discarded. They use two different service providers to take the materials away, one for cardboard and one for all the others, such as paper, solid waste, single-stream recycling, metal, food, and glass. ABC Foods is provided with a container for each type of waste except for cardboard that uses machines to make bales that are loaded directly onto a flatbed truck. Each service level has individual agreements with the service providers. Each service location has a unique scheduling of pickup depending on the locations needs.

The services are defined as Stores (Store 1, Store 2, Store 3, Store 4), and each has four (4) types of services based upon material. The first material is solid waste. This is collected twice a week. The container is a standard 10 cubic yard dumpster. The second material is single stream recycling. This is collected once a week. It is a 10 cubic yard container. The third material is food waste. It is a 6-yard container and collected once a week. The fourth material is cardboard, where bales are placed in the back of the store and collected at minimum once a month, but typically on demand. Many times, in busier seasons more frequent pickups are requested on demand. Warehouses (Warehouse 1, Warehouse 2) each have three (3) types of services based upon material. The solid waste and single stream recycling are treated the same as the stores on frequency and container volume. This is collected once a week. It is a 10 cubic yard container. The fourth material is cardboard and is baled like the stores, but is collected once every two weeks. The ice cream plant has three (3) types of discarded material service which are solid waste, single stream recycling and food waste. The solid waste and single stream are collected twice a week in 12 cubic yard containers and food waste is once a week in a 10 cubic yard container. The root beer plant has three (3) types of discarded material service which are solid waste, single stream recycling and glass. The solid waste and single stream are collected twice a week in 12 cubic yard containers and glass is discarded into an 8-yard dumpster container and replaced on demand, typically once every two months. The corporate office and each branch have the same three (3) types of discarded materials which are solid waste, single stream recycling and a shredded paper service. These solid waste and single stream each have 10 cubic yard containers serviced once a week and the shredded paper service empties the bin once a month.

An analysis of store 1 is shown in FIG. 17, which shows the type of services performed for the month of January. January 1 is a Sunday and January 31 is a Tuesday. For the month of January, we see solid waste and single stream recycling were each picked up 5 times. The food waste was picked up 4 times, and the cardboard was picked up 1 time.

Hypothetical Truck: For a truck, schedules may dictate specific routes with times and destinations, but variations can always occur based upon many circumstances such as weather, road conditions and events. FIG. 18 shows data for a Delta Waste Truck #501 on picking up solid waste from Store 1 on January 3. Delta Waste Truck #501 is a 10-ton truck that runs on diesel fuel. It is assigned to run Route 22 which has preset pickup locations and a destination to unload material.

From this data, we can see ABC Foods had a container full of solid waste picked up on January 3 at 8:55 am. We know the truck traveled a total of 40 round trip miles for this route event. The truck holds 40 compacted cubic yards and gets 4 miles per gallon on diesel fuel. A general emission factor for diesel fuel tailpipe emissions on a large truck is 10,180 grams of $CO_2$ emissions per gallon of diesel fuel used. The sustainability data hub can utilize multiple formulas and methodologies to calculate and allocate transportation emissions for route segments and collection events. There are 7 customers on the route with a total of 74 loose container yards picked up. The collection costs and $CO_2$ emissions for this route segment can be allocated in several ways; for example by customer count and by container size. The amount of $CO_2$ tailpipe emissions is total miles divided by miles per gallon times 10,180 resulting in this calculation: 40÷4×10,180=101,800 total grams of $CO_2$ emitted by the truck on that specific route segment. If allocating transportation emissions by number of customers on the route, the calculation would be total $CO_2$ emissions divided by number of customers: 101,800÷7=14,543 grams of $CO_2$ emissions associated with the ABC Foods collection event. If allocating transportation emissions by container size, the calculation would be total $CO_2$ emissions divided by total yardage of route segment collected multiplied by customer container size: 101,800÷74×10=13,757 grams of $CO_2$ emissions associated with the ABC Foods collection event.

Hypothetical Service Data: Materials may be routed through multiple stops before arriving at a final destination. For example, Store 1 has a service setup for cardboard. For this service, as shown in FIG. 19, a truck picks up a group of bales from the store and takes those bales to a central paper consolidation railyard where the cardboard bales are loaded onto a train to transport a cardboard recycling facility in another state. Omega Paper provides the service data. Omega Paper is only aware of the time, company, source, and destination of the truck, along with the tonnage of the load which was recorded at the scales entering and leaving the railyard Delta Waste, Sigma Composting and Omega Paper each have their own systems to collect information about the services they are providing to their customers, and they have different types of services they are providing. Delta Waste has a service agreement with ABC Foods that involves a truck that services many customers in a route. The waste is combined with waste from other businesses. It is very difficult to get accurate information about the specific container material without help of additional sensors. Very few trucks can measure the weight of ABC Foods' container. Delta Waste collects data on the size of the container and the type of material collected. Tonnage is a calculated value. Sigma Composting works the same as Delta Waste. Tonnage is calculated via volume. Omega Paper picks up its load from ABC Foods and does not combine the load with any other company. The load is weighed and a specific tonnage to the material can be applied. The more a load can be isolated, the more accurate a measure can be. But isolating can come with increased cost to the business, decreased efficiency in material management and increased greenhouse gas emissions.

The sustainability data hub can accept these different scenarios in a standard data feed that has been designed to accept different types of services including the ability to accept tonnage or volume. The standardized data feed is collecting various types on information regarding information for the pickup and disposal of material. The source of data can include, but are not limited to: customer; service date; service transaction type; number of services; container size; container unit of measure; material type; weight; weight unit of measure; service location site; destination site; treatment method; service provider; vehicle used; and route.

Rules are established to ensure a minimum set of information is available. Required fields can include but are not limited to: service date, customer, service location or id, treatment type, material type and either container size and container unit of measure or weight and weight unit of measure. Non-required fields allow the sustainability data hub to make fewer assumptions and produce more accurate numbers.

Figure 15:
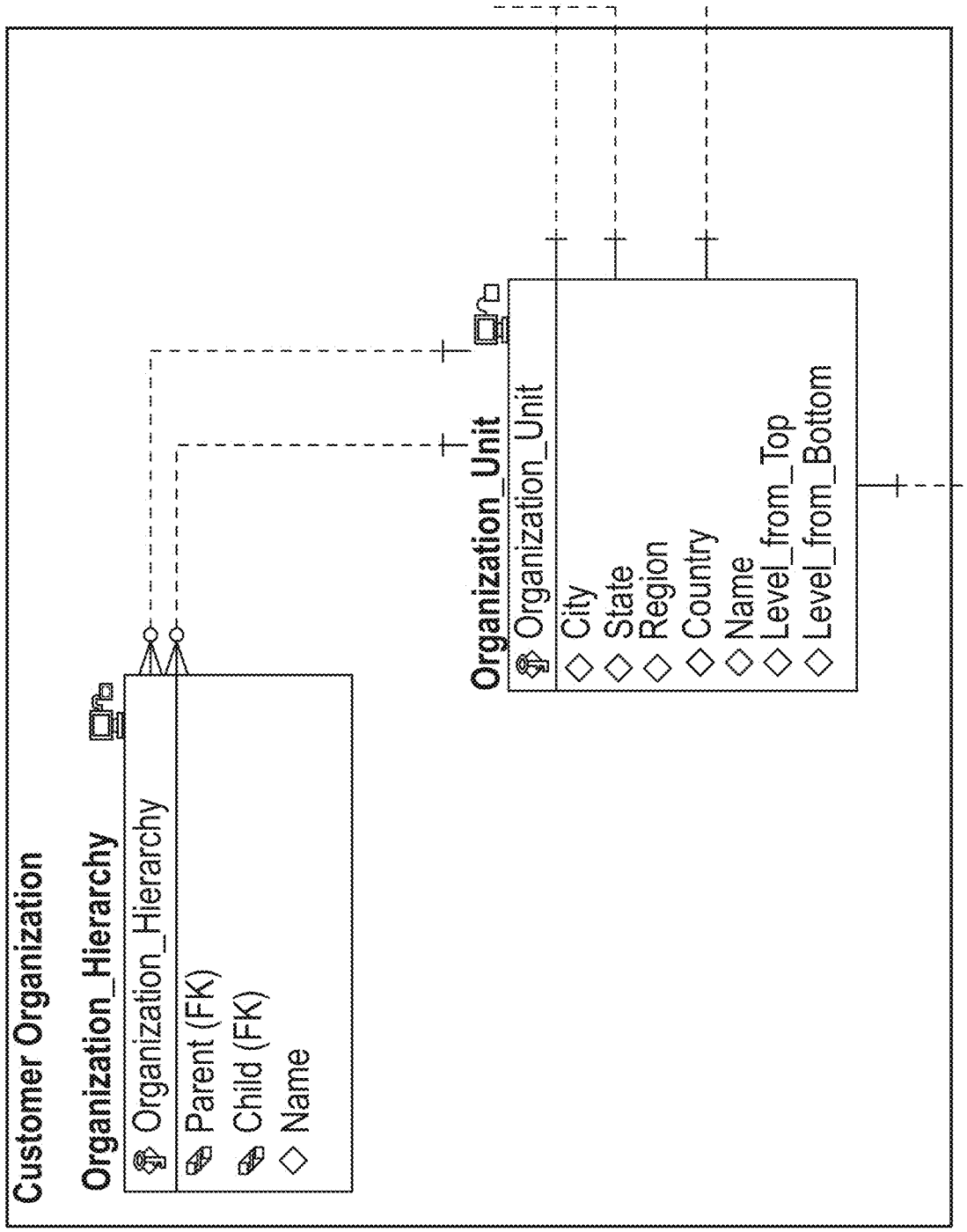
FIG. 15 is an example of sustainability data hub customer tables, in accordance with an illustrative embodiment of the presently disclosed subject matter.

In FIG. 15, the data sources feed information to the infrastructure of the sustainability data hub. Delta Waste, Sigma Composting and Omega Paper feed data into the sustainability data hub. For Delta Waste, this information was received electronically as shown in FIG. 20. For Omega Paper, this information was received electronically as shown in FIG. 21. Sigma Composting did not have any electronic means of sharing information about their food waste services. ABC Foods was able to supply this information on a monthly basis in a CSV file as shown in FIG. 22.

Figure 23:
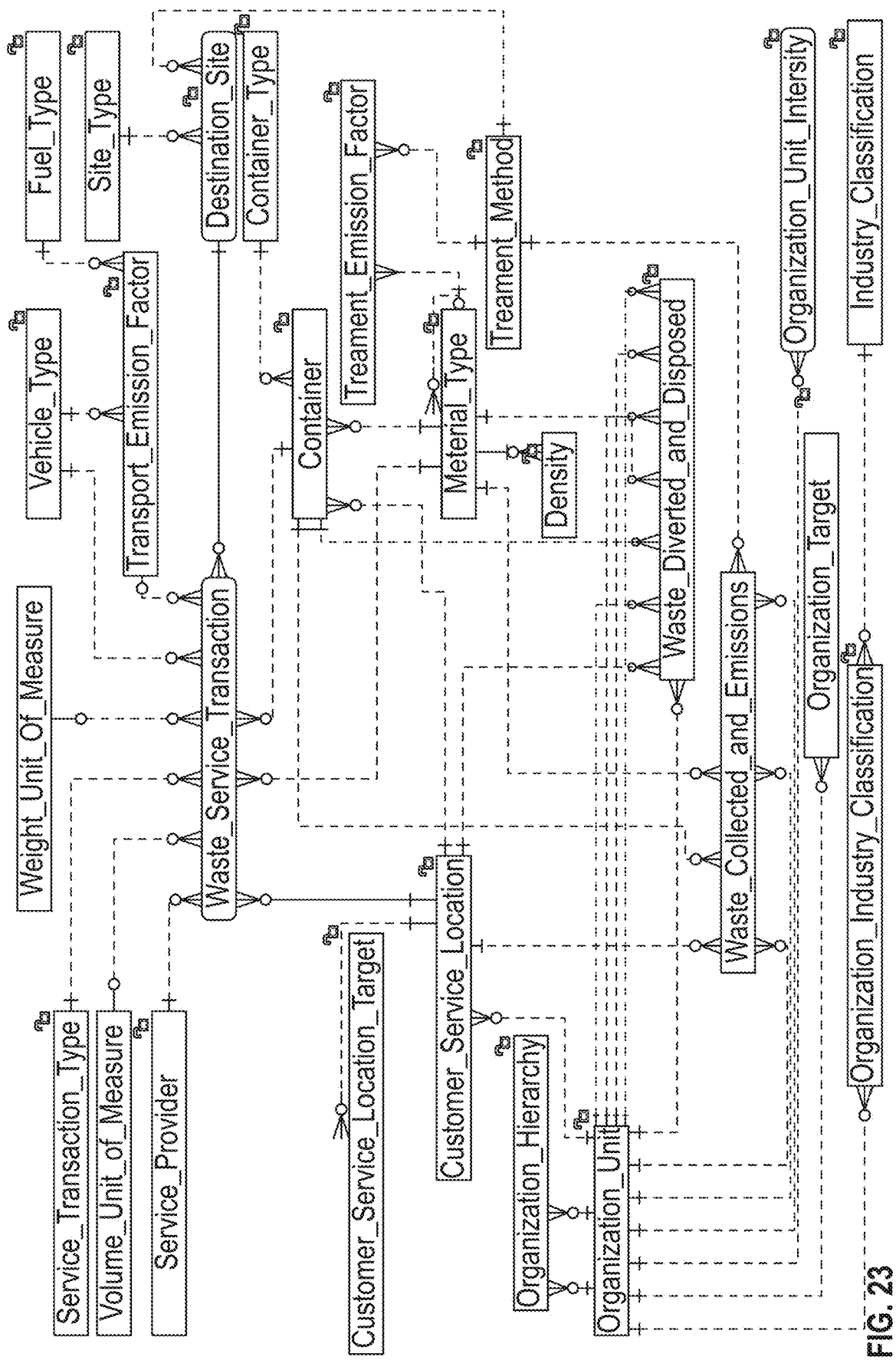
FIG. 23 is an example of a data hub structure for the sustainability data hub, in accordance with an illustrative embodiment of the presently disclosed subject matter.

Each separate data feed is slightly different, but they are each mapped into a standard format for ingestion. The sustainability data hub accepts the input data from the vendors and places the data into a staging table for the integration layer. A validation process is executed to ensure the data is ready to be put into the sustainability data hub data structures shown in FIG. 23.

Required fields are checked to be populated. Container size, weight, gallons used, and route customer count are all fields that must contain numeric values. If weight is a null, then there must be a container size and container unit of measure. If weight is populated, there must be a weight unit of measure. All codes are checked against lookup tables to ensure they exist. These are material type, treatment type, and fuel type. If any of these validations are missed, the data will not be loaded into the integration layer.

The next step of validation is matching of locations. All data about a service must be matched to the locations. Service location name and Service location ID are searched for in the customer tables. A match must be made between the customer service location site and the loaded customer hierarchy service level. All three examples matched the service location name "Store 1" with the customer service level "Store 1." This way, those services can be reported in aggregated groupings associated with the customer reporting hierarchy. If a match cannot be made, this table is stored in a separate table for further validation if a new site is to be added to the current customer.

An exception to this process is for initial loads. Customers may request these service locations to drive an automated load of service and customer enterprise hierarchies. They will backfill any required hierarchy definitions. If Store 1 was not defined in the customer hierarchy, and an automated load was requested, the functional and line of business hierarchy layers would be filled with "Unknown" or some other pre-determined defaulted value. These "Unknown" records could be replaced with a new customer hierarchy load.

Figure 25:
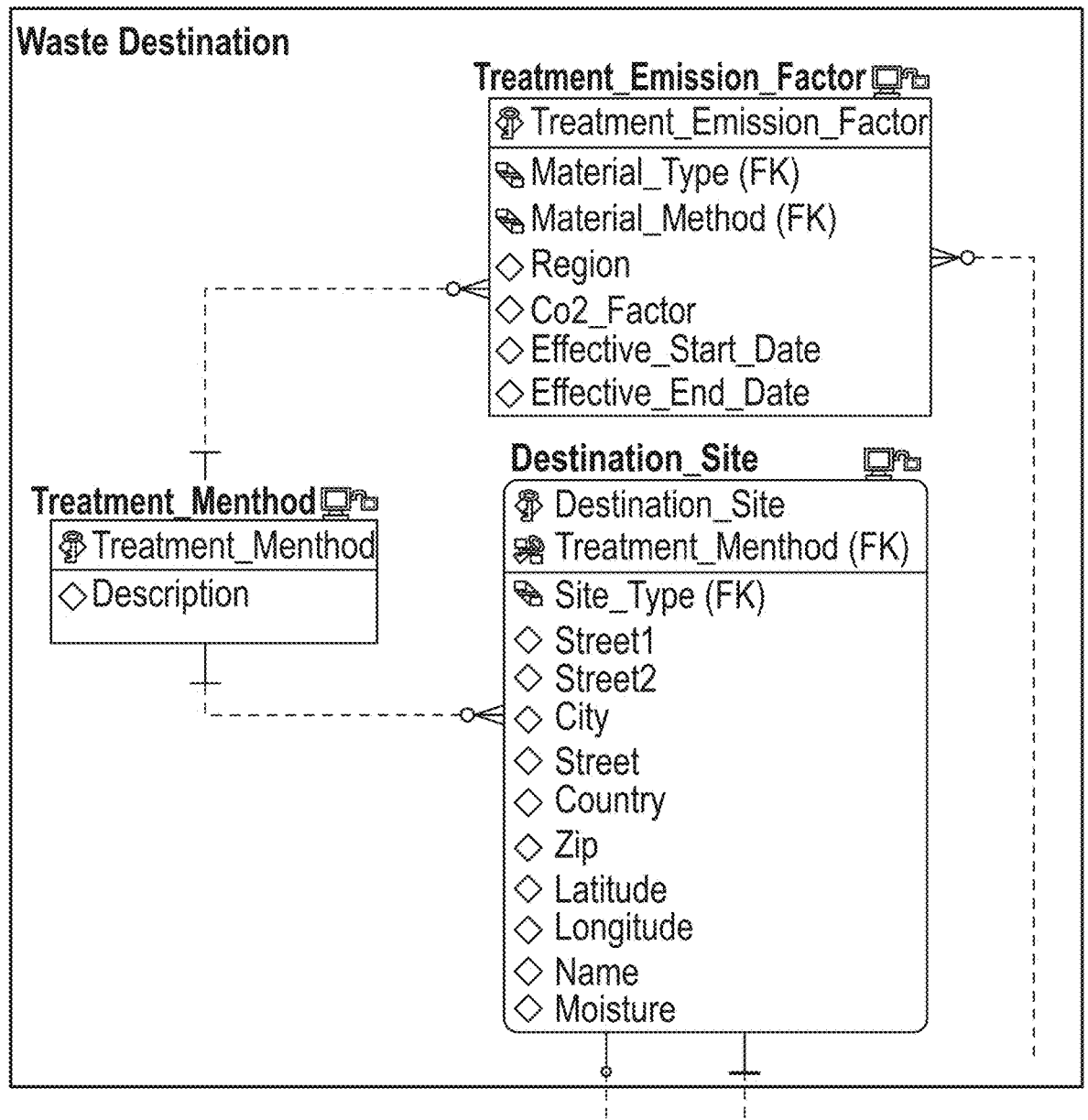
FIG. 25 is an example of a data display after validity checks for the sustainability data hub, in accordance with an illustrative embodiment of the presently disclosed subject matter.

In FIG. 25, the Delta Waste data has passed all validity checks and is ready to load. The Destination Site designation in the sustainability data hub is about the facility where the material was unloaded. Site Location ID "123XYZ" was identified as the destination and treatment method "Landfill-Flare" was previously validated. The site along with the treatment method is checked against the table DESTINATION_SITE. If a record does not exist, then one is created.

Figure 26:
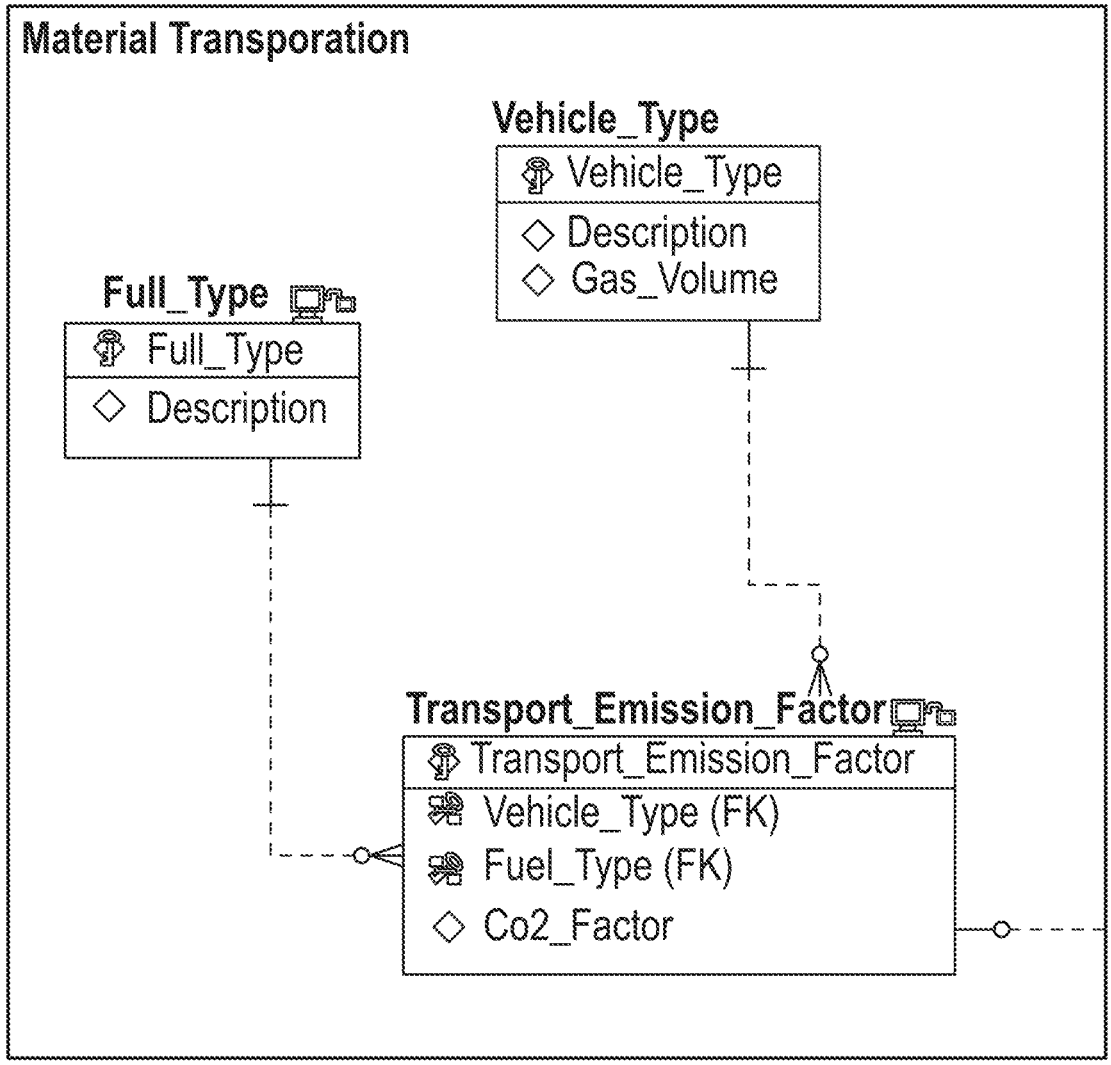
FIG. 26 is an example of a data display for the sustainability data hub, in accordance with an illustrative embodiment of the presently disclosed subject matter.

In FIG. 26, a fuel type was identified, and gallons used were supplied, but not specific information about the vehicle used to transport the material. Diesel was recognized as a pre-defined fuel and has a $CO_2$ emission factor "CO2_FACTOR" associated with a default collection vehicle, which will be used. The site "Store 1" has already been validated. The date, Service Provider and Organization_Unit can be looked up from Service Location Name and ID, Service Provider, Transportation_Emission_Factor, Identified_Material_Type, Service_Count, Treatment_Method, Route_Customer_Count, and Gallons_Used.

Figure 27:
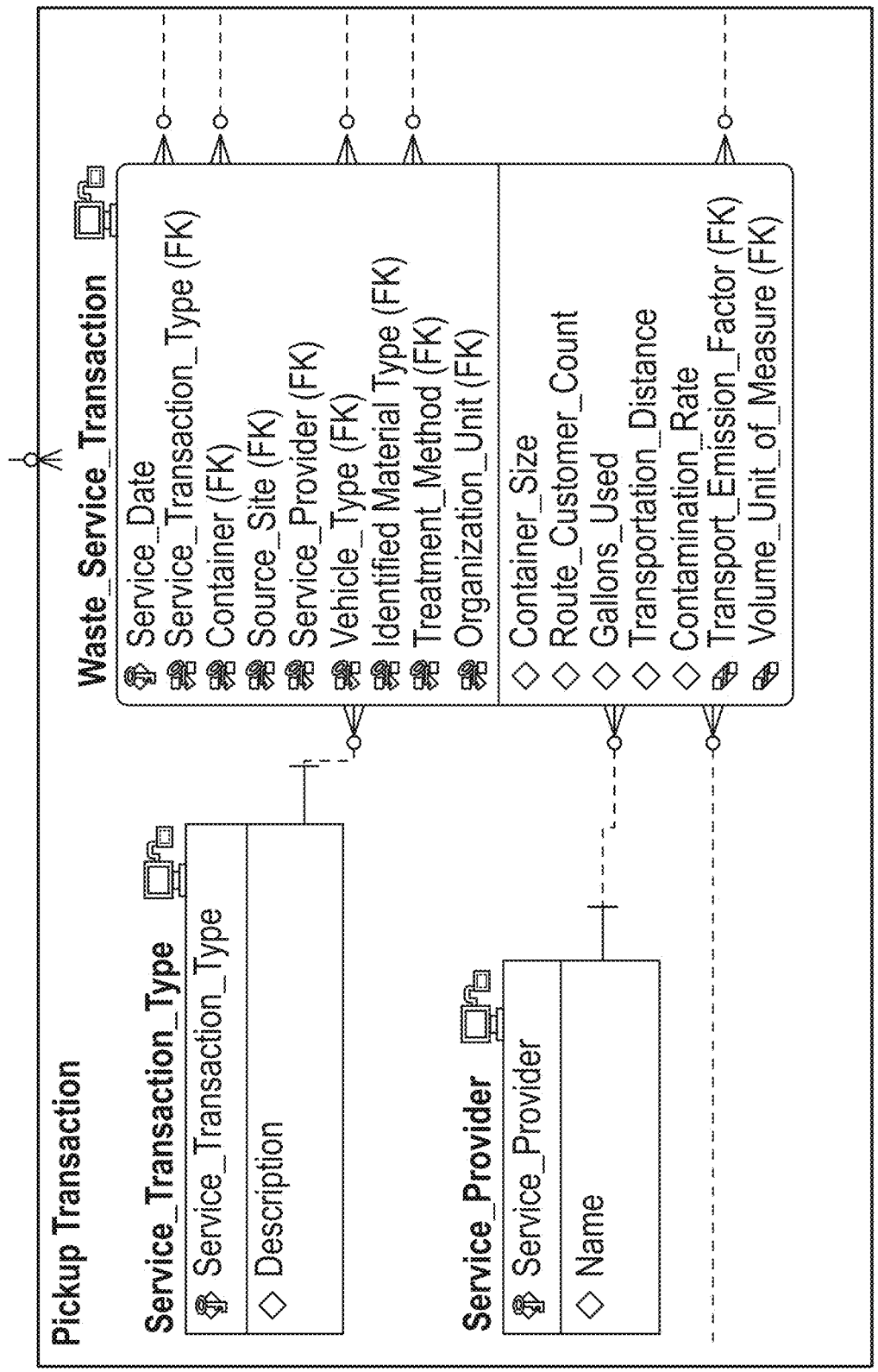
FIG. 27 is an example of a data display for the sustainability data hub, in accordance with an illustrative embodiment of the presently disclosed subject matter.

In FIG. 27, the waste service transaction object captures the details about the individual event of the service defining the pickup and management-process of waste. It associates destination, vehicle, service transaction-type, service providers and customer service location. The waste service transaction stores the measures for which sustainability metrics are built.

FIG. 28 is an example of an analytics model application for waste material weight estimation, in accordance with an illustrative embodiment of the presently disclosed subject matter. FIG. 29 is an example of a decision model for sustainability target optimization, in accordance with an illustrative embodiment of the presently disclosed subject matter.

Those skilled in the art will appreciate that certain portions of the subject matter disclosed herein may be embodied as a method, data processing system, or computer program product. Accordingly, these portions of the subject matter disclosed herein may take the form of an entirely hardware embodiment, an entirely software embodiment, or an embodiment combining software and hardware. Furthermore, portions of the subject matter disclosed herein may be a computer program product on a computer-usable storage medium having computer readable program code on the medium. Any suitable computer readable medium may be utilized including hard disks, CD-ROMs, optical storage devices, or other storage devices. Further, the subject matter described herein may be embodied as systems, methods, devices, or components. Accordingly, embodiments may, for example, take the form of hardware, software or any combination thereof, and/or may exist as part of an overall system architecture within which the software will exist. The present detailed description is, therefore, not intended to be taken in a limiting sense.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. As used herein, the term "A and/or B" means embodiments having element A alone, element B alone, or elements A and B taken together.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims.

It is to be understood that the presently disclosed subject matter is not limited to the embodiment(s) described above and illustrated herein, but encompasses any and all variations falling within the scope of the appended claims.

What is claimed is:

1. A method comprising:
   storing waste and recycling data of a first party in a standardized format in at least one network-based non-transitory storage device comprising a collection of waste and recycling data stored thereon;
   providing remote access to a second party over a network;
   receiving, based on the remote access for the second party, waste and recycling data of the second party through an application programming interface (API) or graphical user interface (GUI), the waste and recycling data of the second party being raw data in a non-standardized format;
   converting, upon receipt of the waste and recycling data of the second party, the waste and recycling data of the second party from the non-standardized format to the standardized format, the conversion comprising modifying the raw data of the waste and recycling data of the second party into a format for storage in the network-based non-transitory storage device and analysis by a sustainability decision model, the modifying comprising transforming the waste and recycling data via data mapping from a raw format to data hub representations based on raw data elements from the raw data;

storing the converted waste and recycling data of the second party in the network-based non-transitory storage device;

generating a sustainability decision model, the sustainability decision model being an artificial intelligence (AI) model generated for analysis of current waste and recycling data stored in the network-based non-transitory storage device;

communicating, over the network, an electronic message to a device of the second party, the electronic message comprising functionality enabling the device of the second party to access and execute the generated sustainability decision model, the functionality causing the device of the second party to execute the sustainability decision model thereby enabling access to the current waste and recycling data stored in the network-based non-transitory storage device, such that the second device is rendered capable of performing real-time analysis of at least the waste and recycling data of the second party;

determining aggregates for total waste, change in waste, benchmark by location, and carbon footprint from waste;

causing display, via the GUI and the provided remote access, on a display of the device of the second party, of the aggregates for total waste, change in waste, benchmark by location, and carbon footprint from waste; and exporting the aggregates for total waste, change in waste, benchmark by location, and carbon footprint from waste to a user in a file.

2. The method of claim 1, wherein the converting of the waste and recycling data of the second party further comprises converting the raw data into the standardized format, the conversion further comprising:

standardizing of addresses to match U.S. Postal Service standards for matching address records;

standardizing of services and locations between the service provider and customer to allow reporting across customer data to material disposal data; normalization of date period of service events with frequency of services across those date periods grain for proper aggregating and reporting of metrics;

standardization of types of business for comparison;

standardization of vehicle fuel types;

standardization of collection vehicle types;

standardization of container types;

standardization of units of measure to international standard (ISO) codes;

standardization of material codes/names, treatment type codes/names, treatment facility types and region code/names to map to external protocols including but not limited to U.S. EPA WARM, U.S. EPA AP42, U.S. EPA GHG Emission Hub and European Environmental Agency;

standardization of intensity factors for benchmarking based on factors including but not limited to square footage, residents, or units produced; and standardization of dates to a common format.

3. The method of claim 1, wherein the converting of the waste and recycling data of the second party further comprises standardization of intensity factors for benchmarking based on each of square footage, residents and units produced.

4. The method of claim 1, further comprising the generated sustainability decision model incorporates the standardized waste and recycling data of the first party and the standardized waste and recycling data of the second party in subscription configurations, wherein the subscription configurations comprise each of the application of the sustainability decision models for waste and recycling weight estimation and the analysis of carbon trade off scenarios based on material and treatment methods.

5. The method of claim 1, wherein generating the sustainability decision model further comprises:

aggregating material type, tonnage, disposal site, disposal method, distance transport type, and treatment method by hierarchy level and industry NAICS classification;

defining a scenario for optimization from the aggregates;

optimizing one or more operational targets by hierarchy level and by specific NAICS classification; and providing a suggestion of the one or more optimized targets.

6. A non-transitory computer-readable storage medium tangibly encoded with computer-executable instructions, that when executed by a processor, perform a method comprising:

storing waste and recycling data of a first party in a standardized format in at least one network-based non-transitory storage device comprising a collection of waste and recycling data stored thereon;

providing remote access to a second party over a network;

receiving, based on the remote access for the second party, waste and recycling data of the second party through an application programming interface (API) or graphical user interface (GUI), the waste and recycling data of the second party being raw data in a non-standardized format;

converting upon receipt of the waste and recycling data of the second party, the waste and recycling data of the second party from the non-standardized format to the standardized format, the conversion comprising modifying the raw data of the waste and recycling data of the second party into a format for storage in the network-based non-transitory storage device and analysis by a sustainability decision model, the modifying comprising transforming the waste and recycling data via data mapping from a raw format to data hub representations based on raw data elements from the raw data;

storing the converted waste and recycling data of the second party in the network-based non-transitory storage device;

generating a sustainability decision model, the sustainability decision model being an artificial intelligence (AI) model generated for analysis of current waste and recycling data stored in the network-based non-transitory storage device;

communicating, over the network, an electronic message to a device of the second party, the electronic message comprising functionality enabling the device of the second party to access and execute the generated sustainability decision model, the functionality causing the device of the second party to execute the sustainability decision model thereby enabling access to the current waste and recycling data stored in the network-based non-transitory storage device, such that the second device is rendered capable of performing real-time analysis of at least the waste and recycling data of the second party;

determining aggregates for total waste, change in waste, benchmark by location, and carbon footprint from waste;

causing display, via the GUI and the provided remote access, on a display of the device of the second party, of the aggregates for total waste, change in waste, benchmark by location, and carbon footprint from waste; and exporting the aggregates for total waste, change in waste, benchmark by location, and carbon footprint from waste to a user in a file.

7. A system comprising:

a processor configured to:

store waste and recycling data of a first party in a standardized format in at least one network-based non-transitory storage device comprising a collection of waste and recycling data stored thereon;

provide remote access to a second party over a network;

receive, based on the remote access for the second party, waste and recycling data of the second party through an application programming interface (API) or graphical user interface (GUI), the waste and recycling data of the second party being raw data in a non-standardized format;

convert upon receipt of the waste and recycling data of the second party, the waste and recycling data of the second party from the non-standardized format to the standardized format, the conversion comprising modifying the raw data of the waste and recycling data of the second party into a format for storage in the network-based non-transitory storage device and analysis by a sustainability decision model, the modifying comprising transforming the waste and recycling data via data mapping from a raw format to data hub representations based on raw data elements from the raw data;

store the converted waste and recycling data of the second party in the network-based non-transitory storage device;

generate a sustainability decision model, the sustainability decision model being an artificial intelligence (AI) model generated for analysis of current waste and recycling data stored in the network-based non-transitory storage device; and communicate, over the network, an electronic message to a device of the second party, the electronic message comprising functionality enabling the device of the second party to access and execute the generated sustainability decision model, the functionality causing the device of the second party to execute the sustainability decision model thereby enabling access to the current waste and recycling data stored in the network-based non-transitory storage device, such that the second device is rendered capable of performing real-time analysis of at least the waste and recycling data of the second party;

determine aggregates for total waste, change in waste, benchmark by location, and carbon footprint from waste;

cause display, via the GUI and the provided remote access, on a display of the device of the second party, of the aggregates for total waste, change in waste, benchmark by location, and carbon footprint from waste; and export the aggregates for total waste, change in waste, benchmark by location, and carbon footprint from waste to a user in a file.

* * * * *